(12) United States Patent
Hillis et al.

(10) Patent No.: US 8,643,955 B2
(45) Date of Patent: Feb. 4, 2014

(54) IMAGE CORRECTION USING INDIVIDUAL MANIPULATION OF MICROLENSES IN A MICROLENS ARRAY

(75) Inventors: W. Daniel Hillis, Encino, CA (US); Nathan P. Myhrvold, Bellevue, WA (US); Lowell L. Wood, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 432 days.

(21) Appl. No.: 12/925,848

(22) Filed: Oct. 28, 2010

(65) Prior Publication Data

US 2011/0122276 A1 May 26, 2011

Related U.S. Application Data

(63) Continuation-in-part of application No. 10/738,626, filed on Dec. 16, 2003, now Pat. No. 7,231,097, and a continuation-in-part of application No. 10/764,340, filed on Jan. 21, 2004, now Pat. No. 7,251,078, and a continuation-in-part of application No. 10/764,431, filed on Jan. 21, 2004, now Pat. No. 6,967,780, and a continuation-in-part of application No. 11/221,350, filed on Sep. 7, 2005, now Pat. No. 7,417,797, and a continuation-in-part of application No. 11/498,427, filed on Aug. 2, 2006, now Pat. No. 7,259,917, and a continuation-in-part of application No. 11/804,314, filed on May 15, 2007, now abandoned, and a continuation-in-part of application No. 11/811,356, filed on Jun. 7, 2007, now Pat. No. 7,742,233, and a continuation-in-part of application No. 12/072,497, filed on Feb. 25, 2008, now Pat. No. 7,826,139.

(51) Int. Cl.
*G02B 15/14* (2006.01)

(52) U.S. Cl.
USPC .......................................................... 359/694

(58) Field of Classification Search
USPC ................................................ 359/694–702
See application file for complete search history.

(56) References Cited

U.S. PATENT DOCUMENTS

| | | | |
|---|---|---|---|
| 4,141,032 A | 2/1979 | Haeusler |
| 4,275,949 A | 6/1981 | Jones |
| 4,584,704 A | 4/1986 | Ferren |
| 5,451,766 A | 9/1995 | VanBerkel |
| 5,581,637 A | 12/1996 | Cass et al. |
| 5,751,863 A | 5/1998 | Farr |
| 5,805,348 A | 9/1998 | Estelle et al. |
| 5,943,050 A | 8/1999 | Bullock et al. |

(Continued)

FOREIGN PATENT DOCUMENTS

| | | |
|---|---|---|
| JP | 06-311411 | 11/1994 |
| JP | 10-290389 | 10/1998 |
| JP | 11-249027 A | 9/1999 |
| JP | 2002-351439 | 12/2002 |

OTHER PUBLICATIONS

Japanese Patent Office official action; App. No. 2006-545737 based on PCT/US2004/041038; Jul. 13, 2010; pp. 1-3. (Machine Translation).

(Continued)

*Primary Examiner* — James Jones

(57) ABSTRACT

A system constructs a composite image using focus assessment information of image regions.

18 Claims, 15 Drawing Sheets

(56) References Cited

U.S. PATENT DOCUMENTS

| | | | |
|---|---|---|---|
| 6,088,083 | A | 7/2000 | Meier |
| 6,115,146 | A | 9/2000 | Suzuki et al. |
| 6,967,780 | B2 | 11/2005 | Hillis et al. |
| 7,012,757 | B2 | 3/2006 | Wallerstein et al. |
| 7,046,401 | B2 | 5/2006 | Dufaux et al. |
| 7,058,233 | B2 | 6/2006 | Silber |
| 7,308,158 | B2 | 12/2007 | Herbert et al. |
| 2002/0114077 | A1* | 8/2002 | Javidi .................. 359/618 |
| 2002/0176011 | A1 | 11/2002 | Kuwayama |
| 2002/0181762 | A1 | 12/2002 | Silber |
| 2003/0071969 | A1 | 4/2003 | Levine et al. |
| 2003/0098352 | A1 | 5/2003 | Schnee et al. |
| 2003/0122936 | A1 | 7/2003 | Pyle et al. |
| 2005/0157394 | A1 | 7/2005 | Hillis et al. |
| 2006/0098861 | A1 | 5/2006 | See et al. |

OTHER PUBLICATIONS

PCT International Search Report; International App. No. PCT/US05/01513; Sep. 13, 2005.

PCT International Search Report; International App. No. PCT/US05/00844; Aug. 8, 2006.

PCT International Search Report; International App. No. PCT/US04/41038; Sep. 6, 2006.

Yuan, Ta; "Integration of Focus and Defocus Analysis with Color Stereo for Three-Dimensional Shape Recovery"; Dept. of Electrical and Computer Engineering; SUNY at Stony Brook; bearing a date of Dec. 1999; located at http://www.ee.sunysb.edu/~cvl/Publications/TaYuan_Thesis1999.ps.gz; 158 pages.

"Image Focus and Defocus Analysis for 3D Vision"; located at http://www.ece.sunysb.edu/~cvl/DFD/html, printed on Jan. 20, 2004; pp. 1-2.

* cited by examiner

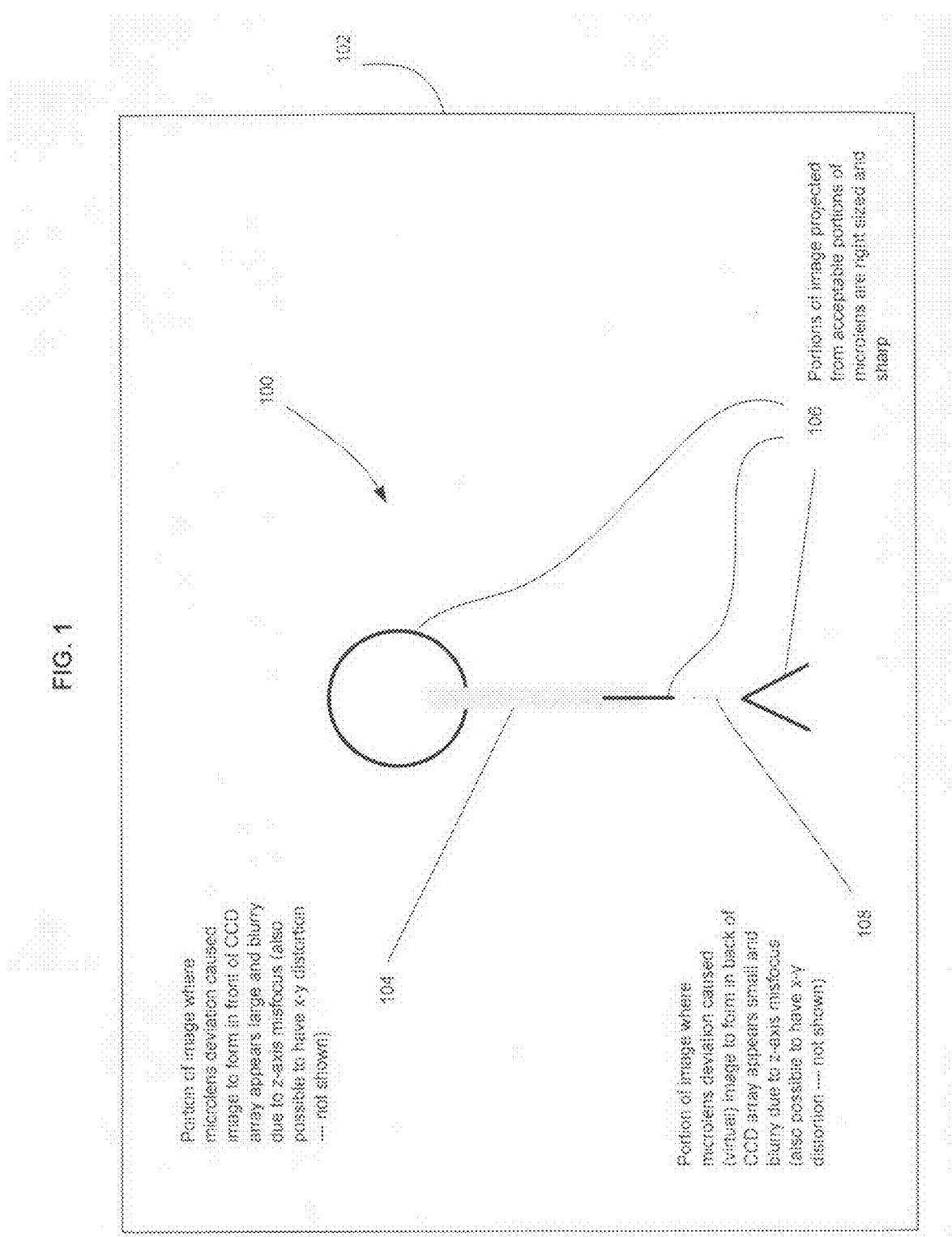

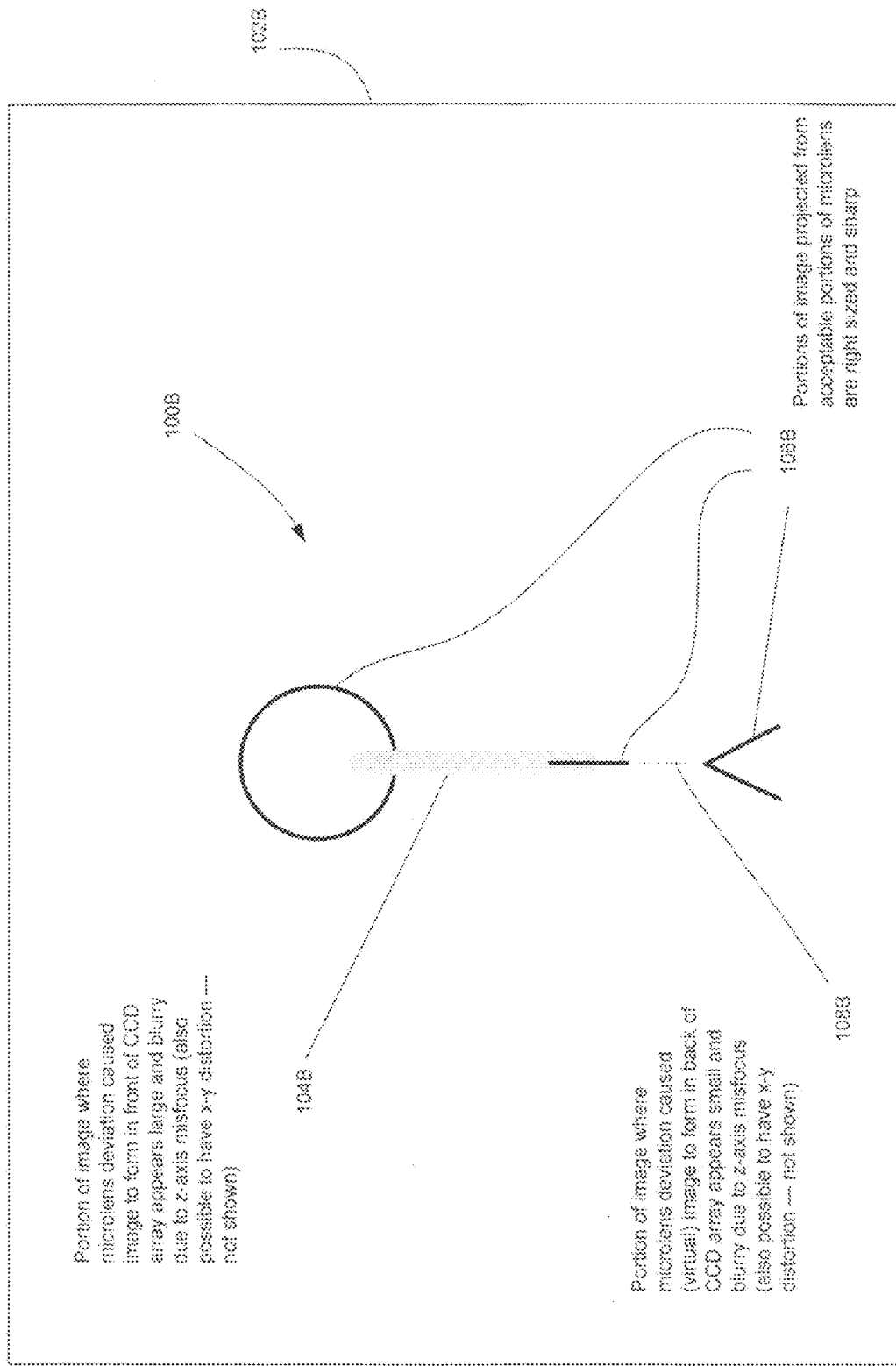

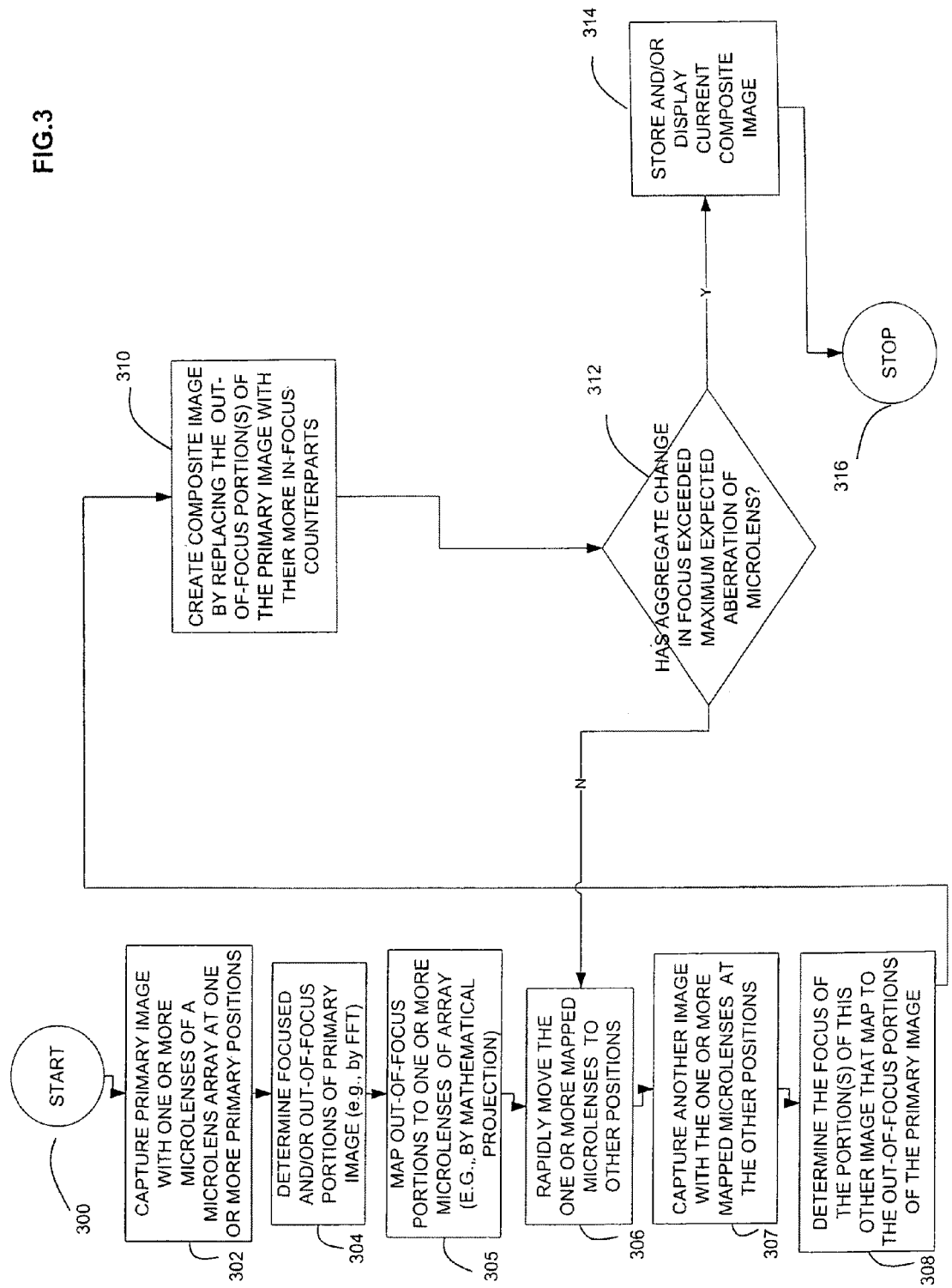

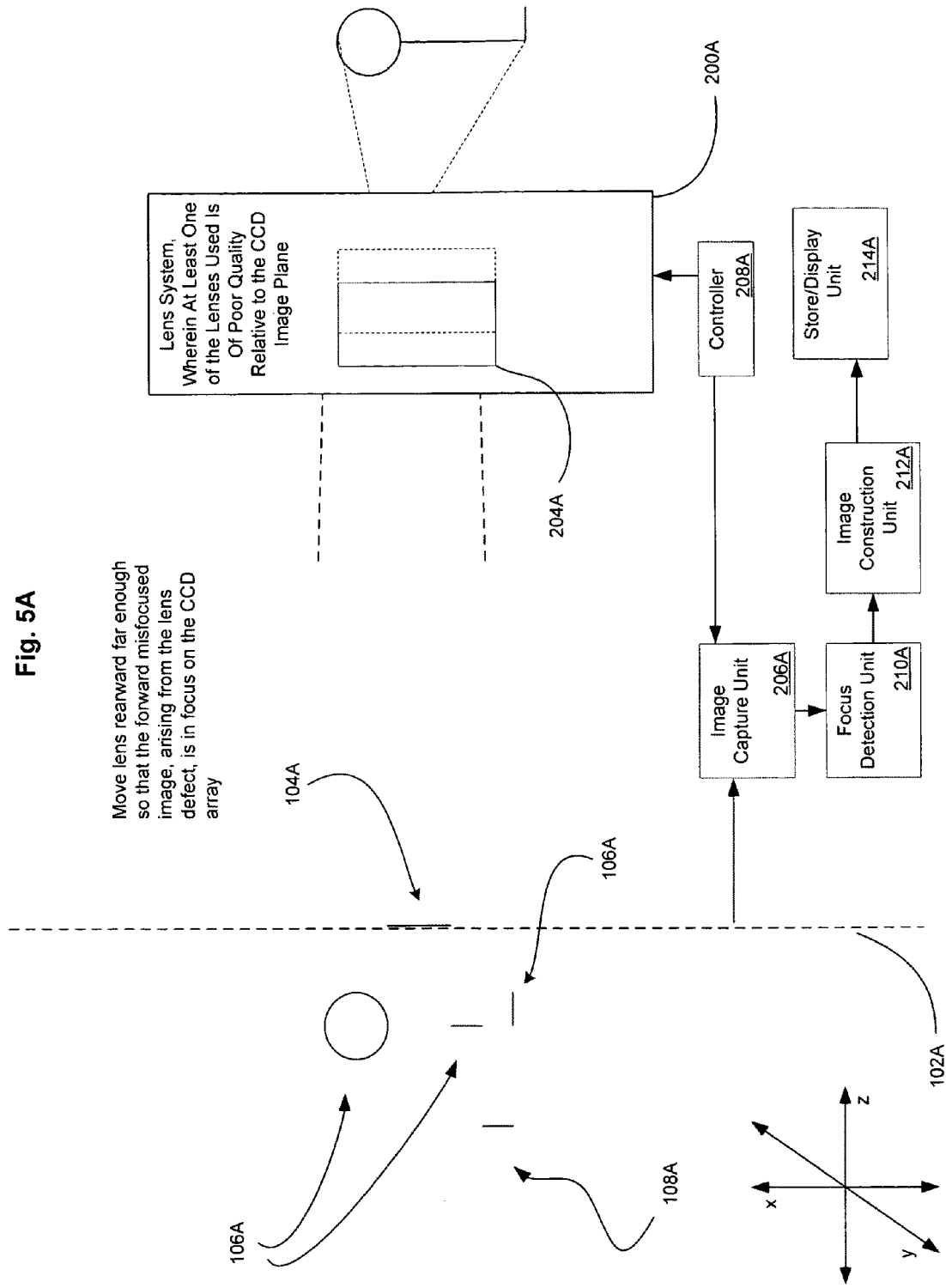

IMAGE CORRECTION USING INDIVIDUAL MANIPULATION OF MICROLENSES IN A MICROLENS ARRAY

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)), and incorporates by reference in its entirety all subject matter of the following listed application(s) (the "Related Applications"); the present application also claims the earliest available effective filing date(s) from, and also incorporates by reference in its entirety all subject matter of any and all parent, grandparent, great-grandparent, etc. applications of the Related Application(s) to the extent such subject matter is not inconsistent herewith. The United States Patent Office (USPTO) has published a notice to the effect that the USPTO's computer programs require that patent applicants reference both a serial number and indicate whether an application is a continuation or continuation in part. Stephen G. Kunin, Benefit of Prior-Filed Application, USPTO Official Gazette Mar. 18, 2003. The present Applicant entity (hereinafter "Applicant") has provided below a specific reference to the application(s) from which priority is being claimed as recited by statute. Applicant understands that the statute is unambiguous in its specific reference language and does not require either a serial number or any characterization such as "continuation" or "continuation-in-part" for claiming priority to U.S. patent applications. Notwithstanding the foregoing, Applicant understands that the USPTO's computer programs have certain data entry requirements, and hence Applicant is designating the present application as a continuation in part of its parent applications as set forth below, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

RELATED APPLICATION(S)

1. For purposes of the USPTO extra-statutory requirements, the present application constitutes a continuation in part of currently United States patent application entitled LENS DEFECT CORRECTION, U.S. application Ser. No. 10/738,626, now U.S. Pat. No. 7,231,097, naming William D. Hillis, Nathan P. Myhrvold, and Lowell L. Wood Jr. as inventors, filed 16 Dec. 2003, which is currently co-pending, or is an application of which a currently co-pending application is entitled to the benefit of the filing date.
2. For purposes of the USPTO extra-statutory requirements, the present application constitutes a continuation in part of currently United States patent application entitled IMAGE CORRECTION USING MICROLENS ARRAY AS A UNIT, U.S. application Ser. No. 10/764,340, now U.S. Pat. No. 7,251,078, naming William D. Hillis, Nathan P. Myhrvold, and Lowell L. Wood Jr. as inventors, filed 21 Jan. 2004, which is currently co-pending, or is an application of which a currently co-pending application is entitled to the benefit of the filing date.
3. For purposes of the USPTO extra-statutory requirements, the present application constitutes a continuation-in-part of U.S. patent application Ser. No. 10/764,431, now U.S. Pat. No. 6,967,780, entitled IMAGE CORRECTION USING INDIVIDUAL MANIPULATION OF MICROLENSES IN A MICROLENS ARRAY, naming W. Daniel Hillis; Nathan P. Myhrvold; and Lowell L. Wood, Jr. as inventors, filed 21 Jan. 2004, which is currently co-pending, or is an application of which a currently co-pending application is entitled to the benefit of the filing date.
4. For purposes of the USPTO extra-statutory requirements, the present application constitutes a continuation-in-part of U.S. patent application Ser. No. 11/221,350, now U.S. Pat. No. 7,417,797 entitled IMAGE CORRECTION USING INDIVIDUAL MANIPULATION OF MICROLENSES IN A MICROLENS ARRAY, naming W. Daniel Hillis; Nathan P. Myhrvold; and Lowell L. Wood, Jr. as inventors, filed 7 Sep. 2005, which is currently co-pending, or is an application of which a currently co-pending application is entitled to the benefit of the filing date.
5. For purposes of the USPTO extra-statutory requirements, the present application constitutes a continuation-in-part of U.S. patent application Ser. No. 11/498,427, now U.S. Pat. No. 7,259,917 entitled IMAGE CORRECTION USING A MICROLENS ARRAY AS A UNIT, naming W. Daniel Hillis; Nathan P. Myhrvold; and Lowell L. Wood, Jr. as inventors, filed 2 Aug. 2006, which is currently co-pending, or is an application of which a currently co-pending application is entitled to the benefit of the filing date.
6. For purposes of the USPTO extra-statutory requirements, the present application constitutes a continuation-in-part of U.S. patent application Ser. No. 11/804,314, entitled LENS DEFECT CORRECTION, naming W. Daniel Hillis; Nathan P. Myhrvold; and Lowell L. Wood, Jr. as inventors, filed 15 May 2007, now abandoned which is currently co-pending, or is an application of which a currently co-pending application is entitled to the benefit of the filing date.
7. For purposes of the USPTO extra-statutory requirements, the present application constitutes a continuation-in-part of U.S. patent application Ser. No. 11/811,356, now U.S. Pat. No. 7,742,233, entitled IMAGE CORRECTION USING MICROLENS ARRAY AS A UNIT, naming W. Daniel Hillis; Nathan P. Myhrvold; and Lowell L. Wood, Jr. as inventors, filed 7 Jun. 2007, which is currently co-pending, or is an application of which a currently co-pending application is entitled to the benefit of the filing date.
8. For purposes of the USPTO extra-statutory requirements, the present application constitutes a continuation-in-part of U.S. patent application Ser. No. 12/072,497, entitled IMAGE CORRECTION USING INDIVIDUAL MANIPULATION OF MICROLENSES IN A MICROLENS ARRAY, naming W. Daniel Hillis; Nathan P. Myhrvold; and Lowell L. Wood, Jr. as inventors, filed 25 Feb. 2008, now U.S. Pat. No. 7,826,139 which is currently co-pending, or is an application of which a currently co-pending application is entitled to the benefit of the filing date.

TECHNICAL FIELD

The present application relates, in general, to imaging.

SUMMARY

In one aspect, a method includes but is not limited to: capturing a primary image with a microlens array at a primary position, the microlens array having at least one microlens deviation that exceeds a first tolerance from a target optical property; determining at least one out-of-focus region of the primary image; capturing another image with at least one microlens of the microlens array at another position; determining a focus of at least one region of the other image relative to a focus of the at least one out-of-focus region of the primary image; and constructing a composite image in response to the at least one region of the other image having a sharper focus relative to the focus of the at least one out-of-focus region of the primary image. In addition to the foregoing, other method embodiments are described in the claims, drawings, and text forming a part of the present application. In addition to the foregoing, other method aspects are described in the claims, drawings, and text forming a part of the present application.

In one or more various aspects, related systems include but are not limited to machinery and/or circuitry and/or programming for effecting the herein-referenced method aspects; the machinery and/or circuitry and/or programming can be virtually any combination of hardware, software, and/or firmware configured to effect the foregoing-referenced method aspects depending upon the design choices of the system designer.

In one aspect, a system includes but is not limited to: a photo-detector array; a microlens array having at least one microlens deviation that exceeds a first tolerance from a target optical property; a controller configured to position at least one microlens of the microlens array at a primary and another position relative to the photo-detector array and to cause an image capture signal at the primary and the other position; and an image construction unit configured to construct at least one out-of-focus region of a first image captured at the primary position with a more in-focus region of another image captured at the other position. In addition to the foregoing, other system aspects are described in the claims, drawings, and text forming a part of the present application.

In one aspect, a system includes but is not limited to: a microlens array having at least one microlens deviation that exceeds a first tolerance from a target optical property; an electro-mechanical system configurable to capture a primary image with at least one microlens of the microlens array at a primary position said electro-mechanical system including at least one of electrical circuitry operably coupled with a transducer, electrical circuitry having at least one discrete electrical circuit, electrical circuitry having at least one integrated circuit, electrical circuitry having at least one application specific integrated circuit, electrical circuitry having a general purpose computing device configured by a computer program, electrical circuitry having a memory device, and electrical circuitry having a communications device; an electro-mechanical system configurable to capture another image with the at last one microlens of the microlens array at another position said electro-mechanical system including at least one of electrical circuitry operably coupled with a transducer, electrical circuitry having at least one discrete electrical circuit, electrical circuitry having at least one integrated circuit, electrical circuitry having at least one application specific integrated circuit, electrical circuitry having a general purpose computing device configured by a computer program, electrical circuitry having a memory device, and electrical circuitry having a communications device; an electro-mechanical system configurable to determine at least one out-of-focus region of the primary image said electro-mechanical system including at least one of electrical circuitry operably coupled with a transducer, electrical circuitry having at least one discrete electrical circuit, electrical circuitry having at least one integrated circuit, electrical circuitry having at least one application specific integrated circuit, electrical circuitry having a general purpose computing device configured by a computer program, electrical circuitry having a memory device, and electrical circuitry having a communications device; an electro-mechanical system configurable to determine a focus of at least one region of the other image relative to a focus of the at least one out-of-focus region of the primary image said electro-mechanical system including at least one of electrical circuitry operably coupled with a transducer, electrical circuitry having at least one discrete electrical circuit, electrical circuitry having at least one integrated circuit, electrical circuitry having at least one application specific integrated circuit, electrical circuitry having a general purpose computing device configured by a computer program, electrical circuitry having a memory device, and electrical circuitry having a communications device; an electro-mechanical system configurable to determine a focus of at least one region of the other image relative to a focus of the at least one out-of-focus region of the primary image said electro-mechanical system including at least one of electrical circuitry operably coupled with a transducer, electrical circuitry having at least one discrete electrical circuit, electrical circuitry having at least one integrated circuit, electrical circuitry having at least one application specific integrated circuit, electrical circuitry having a general purpose computing device configured by a computer program, electrical circuitry having a memory device, and electrical circuitry having a communications device; and an electro-mechanical system configurable to construct a composite image in response to the at least one region of the other image having a sharper focus relative to the focus of the at least one out-of-focus region of the primary image said electro-mechanical system including at least one of electrical circuitry operably coupled with a transducer, electrical circuitry having at least one discrete electrical circuit, electrical circuitry having at least one integrated circuit, electrical circuitry having at least one application specific integrated circuit, electrical circuitry having a general purpose computing device configured by a computer program, electrical circuitry having a memory device, and electrical circuitry having a communications device. In addition to the foregoing, other system aspects are described in the claims, drawings, and text forming a part of the present application.

In one aspect, a method includes but is not limited to: capturing a primary image with a microlens array at a primary position, said capturing effected with a photo-detector array having an imaging surface deviation that exceeds a first tolerance from a target surface position; determining at least one out-of-focus region of the primary image; capturing another image with at least one microlens of the microlens array at another position; determining a focus of at least one region of the other image relative to a focus of the at least one out-of-focus region of the primary image; and constructing a composite image in response to the at least one region of the other image having a sharper focus relative to the focus of the at least one out-of-focus region of the primary image. In addition to the foregoing, other method aspects are described in the claims, drawings, and text forming a part of the present application.

In one embodiment, a method includes but is not limited to: capturing a primary image with a lens at a primary position, the lens having at least one deviation that exceeds a first tolerance from a target optical property; capturing another image with the lens at another position; determining at least one out-of-focus region of the primary image; determining a focus of at least one region of the other image relative to a focus of the at least one out-of-focus region of the primary image; and constructing a composite image in response to the at least one region of the other image having a sharper focus relative to the focus of the at least one out-of-focus region of the primary image. In addition to the foregoing, various other method embodiments are set forth and described in the text (e.g., claims and/or detailed description) and/or drawings of the present application.

In one or more various embodiments, related systems include but are not limited to electro-mechanical systems (e.g., motors, actuators, circuitry, and/or programming) for effecting the herein-referenced method embodiments); the electrical circuitry can be virtually any combination of hardware, software, and/or firmware configured to effect the foregoing-referenced method embodiments depending upon the design choices of the system designer.

In one embodiment, a system includes but is not limited to: a photo-detector array; a lens having at least one deviation that exceeds a first tolerance from a target optical property; a controller configured to position said lens at a primary and another position relative to said photo-detector array and to cause an image capture signal at the primary and the other position; and an image construction unit configured to construct at least one out-of-focus region of a first image captured at the primary position with a more in-focus region of another image captured at the other position.

In one aspect, a method includes but is not limited to: capturing a primary image with a microlens array at a primary position, the microlens array having at least one microlens deviation that exceeds a first tolerance from a target optical property; determining at least one out-of-focus region of the primary image; capturing another image with the microlens array at another position; determining a focus of at least one region of the other image relative to a focus of the at least one out-of-focus region of the primary image; and constructing a composite image in response to the at least one region of the other image having a sharper focus relative to the focus of the at least one out-of-focus region of the primary image. In addition to the foregoing, other method aspects are described in the claims, drawings, and text forming a part of the present application.

In one or more various aspects, related systems include but are not limited to machinery and/or circuitry and/or programming for effecting the herein-referenced method aspects; the machinery and/or circuitry and/or programming can be virtually any combination of hardware, software, and/or firmware configured to effect the foregoing-referenced method aspects depending upon the design choices of the system designer.

In one aspect, a system includes but is not limited to: a microlens array having at least one microlens deviation that exceeds a first tolerance from a target optical property; means for capturing a primary image with a lens at a primary position; means for determining at least one out-of-focus region of the primary image; means for capturing another image with the lens at another position; means for determining a focus of at least one region of the other image relative to a focus of the at least one out-of-focus region of the primary image; and means for constructing a composite image in response to the at least one region of the other image having a sharper focus relative to the focus of the at least one out-of-focus region of the primary image. In addition to the foregoing, other system aspects are described in the claims, drawings, and text forming a part of the present application.

In one aspect, a system includes but is not limited to: a microlens array having at least one microlens deviation that exceeds a first tolerance from a target optical property; an electro-mechanical system configurable to capture a primary image with the microlens array at a primary position said electro-mechanical system including at least one of electrical circuitry operably coupled with a transducer, electrical circuitry having at least one discrete electrical circuit, electrical circuitry having at least one integrated circuit, electrical circuitry having at least one application specific integrated circuit, electrical circuitry having a general purpose computing device configured by a computer program, electrical circuitry having a memory device, and electrical circuitry having a communications device; an electro-mechanical system configurable to capture another image with the microlens array at another position said electro-mechanical system including at least one of electrical circuitry operably coupled with a transducer, electrical circuitry having at least one discrete electrical circuit, electrical circuitry having at least one integrated circuit, electrical circuitry having at least one application specific integrated circuit, electrical circuitry having a general purpose computing device configured by a computer program, electrical circuitry having a memory device, and electrical circuitry having a communications device; an electro-mechanical system configurable to determine at least one out-of-focus region of the primary image said electro-mechanical system including at least one of electrical circuitry operably coupled with a transducer, electrical circuitry having at least one discrete electrical circuit, electrical circuitry having at least one integrated circuit, electrical circuitry having at least one application specific integrated circuit, electrical circuitry having a general purpose computing device configured by a computer program, electrical circuitry having a memory device, and electrical circuitry having a communications device; an electro-mechanical system configurable to determine a focus of at least one region of the other image relative to a focus of the at least one out-of-focus region of the primary image said electro-mechanical system including at least one of electrical circuitry operably coupled with a transducer, electrical circuitry having at least one discrete electrical circuit, electrical circuitry having at least one integrated circuit, electrical circuitry having at least one application specific integrated circuit, electrical circuitry having a general purpose computing device configured by a computer program, electrical circuitry having a memory device, and electrical circuitry having a communications device; an electro-mechanical system configurable to determine a focus of at least one region of the other image relative to a focus of the at least one out-of-focus region of the primary image said electro-mechanical system including at least one of electrical circuitry operably coupled with a transducer, electrical circuitry having at least one discrete electrical circuit, electrical circuitry having at least one integrated circuit, electrical circuitry having at least one application specific integrated circuit, electrical circuitry having a general purpose computing device configured by a computer program, electrical circuitry having a memory device, and electrical circuitry having a communications device; and an electro-mechanical system configurable to construct a composite image in response to the at least one region of the other image having a sharper focus relative to the focus of the at least one out-of-focus region of the primary image said electro-mechanical system including at least one of electrical circuitry operably coupled with a transducer, electrical circuitry having at least one discrete electrical circuit, electrical circuitry having at least one integrated circuit, electrical circuitry having at least one application specific integrated circuit, electrical circuitry having a general purpose computing device configured by a computer program, electrical circuitry having a memory device, and electrical circuitry having a communications device. In addition to the foregoing, other system aspects are described in the claims, drawings, and text forming a part of the present application.

In one aspect, a method includes but is not limited to: capturing a primary image with a microlens array at a primary position, said capturing effected with a photo-detector array having an imaging surface deviation that exceeds a first tolerance from a target surface position; determining at least one out-of-focus region of the primary image; capturing another image with the microlens array at another position; determining a focus of at least one region of the other image relative to a focus of the at least one out-of-focus region of the primary image; and constructing a composite image in response to the at least one region of the other image having a sharper focus relative to the focus of the at least one out-of-focus region of the primary image. In addition to the foregoing, other method aspects are described in the claims, drawings, and text forming a part of the present application.

In addition to the foregoing, various other method and/or system aspects are set forth and described in the text (e.g., claims and/or detailed description) and/or drawings of the present application.

The foregoing is a summary and thus contains, by necessity; simplifications, generalizations and omissions of detail; consequently, those skilled in the art will appreciate that the summary is illustrative only and is NOT intended to be in any way limiting. Other aspects, inventive features, and advantages of the devices and/or processes described herein, as defined solely by the claims, will become apparent in the non-limiting detailed description set forth herein.

BRIEF DESCRIPTION OF THE FIGURES

FIG. 1 shows a front-plan view of image 100 of a person (e.g., person 202 of FIG. 2) projected onto photo-detector array 102.

FIG. 3 depicts a high level logic flowchart of a process.

FIG. 5A illustrates another side-plan view of the system of FIG. 2A wherein lens 204A has been moved in accordance with aspects of the process shown and described in relation to FIG. 3A.

FIG. 1B shows a front-plan view of image 100B of a person (e.g., person 202B of FIG. 2B) projected onto photo-detector array 102B.

The use of the same symbols in different drawings typically indicates similar or identical items.

DETAILED DESCRIPTION

Figure 1A:
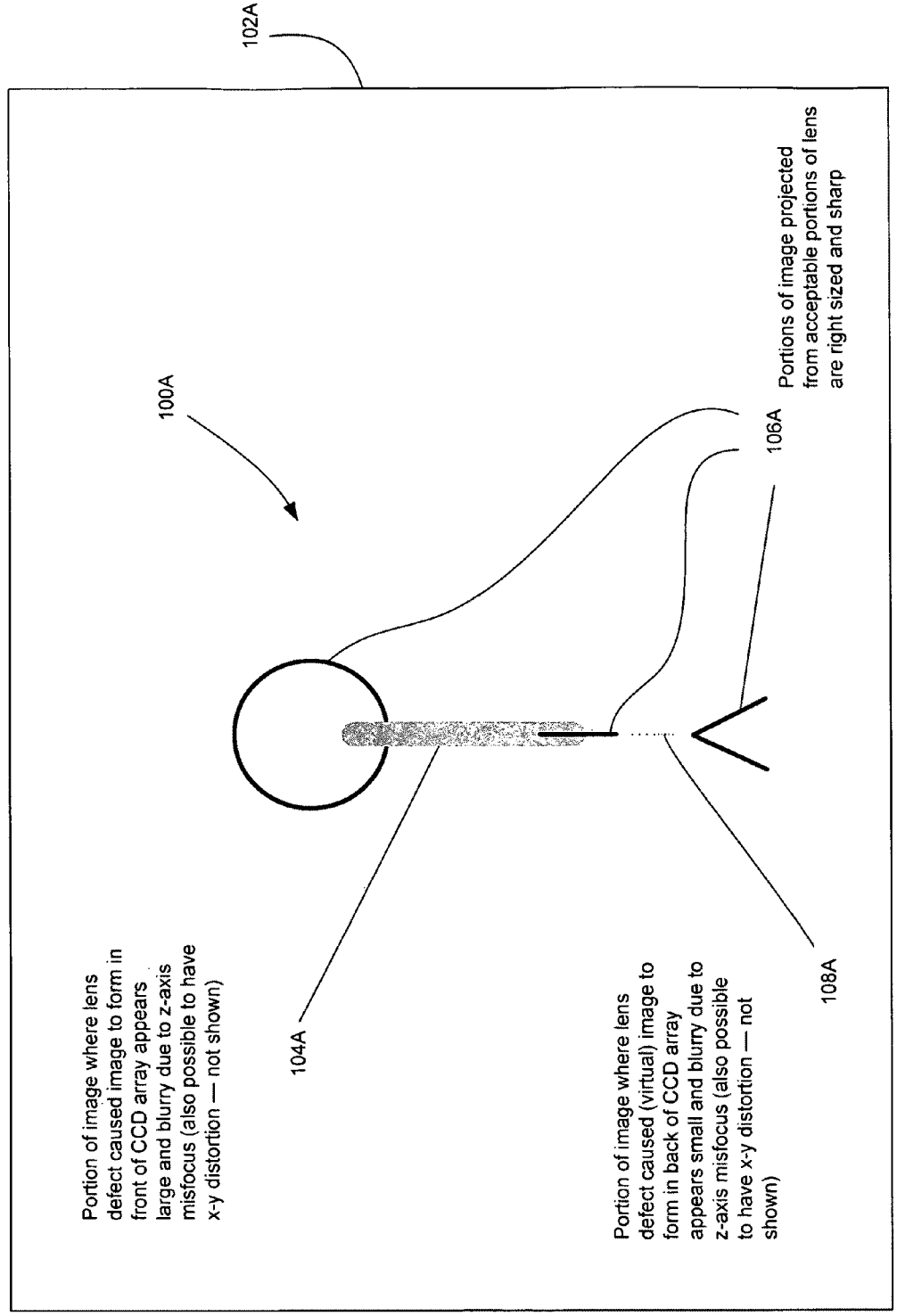
FIG. 1A shows a front-plan view of image 100A of a person (e.g., person 202A of FIG. 2A) projected onto photo-detector array 102A.

With reference to the figures, and with reference now to FIG. 1, shown is a front-plan view of image 100 of a person (e.g., person 202 of FIG. 2) projected onto photo-detector array 102. Image 100 is shown as distorted due to defects in a microlens array through which image 100 has been projected (e.g., microlens array 204 of lens system 200 of FIG. 2). First portion 104 of image 100 is illustrated as large and blurry, which can occur when a microlens deviation causes first portion 104 of image 100 to come to a focus in front of a surface of photo-detector array 102. Second, third, and fourth portions 106 of image 100 are illustrated as right sized, which can occur when microlenses of the microlens array cause portions 106 to correctly focus on an imaging surface of photo-detector array 102. Fifth portion 108 of image 100 is shown as small and faint, which can occur when a microlens deviation causes fifth portion 108 to come to a focus (virtual) behind an imaging surface of photo-detector array 102. In addition, although not expressly shown, those having skill in the art will appreciate that various microlens defects could also cause the image to be distorted in x-y; those having skill in the art will also appreciate that different colored wavelengths of light can in and of themselves focus at different positions due to differences in refraction of the different colored wavelengths of light. In addition, although not expressly shown herein, those having skill in the art will appreciate that the subject matter disclosed herein may serve to remedy misfocusings/distortions arising from defects other than lens defects, such as, for example, defects in the imaging surface of photo-detector array 102 and/or defects in frames that hold microlens arrays.

Figure 2:
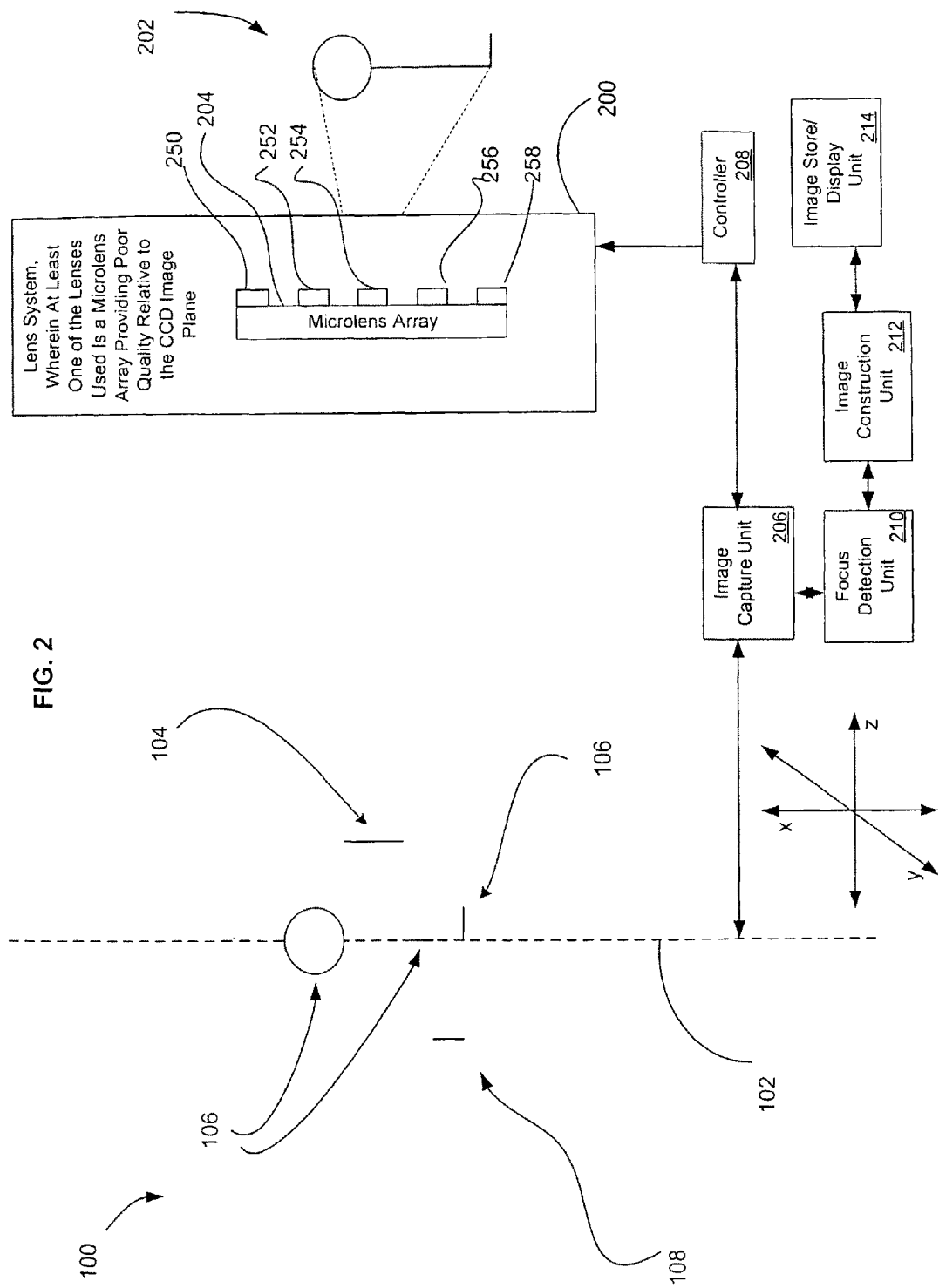
FIG. 2 depicts a side-plan view of lens system 200 that can give rise to image 100 of FIG. 1.

Referring now to FIG. 2, depicted is a side-plan view of lens system 200 that can give rise to image 100 of FIG. 1. Microlens array 204 of lens system 200 is illustrated as located at a primary position and having microlens deviations that give rise to the five different portions of image 100 shown and described in relation to FIG. 1. First portion 104 of image 100 is illustrated as misfocused in front of an imaging surface of photo-detector array 102, where the misfocusing is due to a deviation of microlens 252. Second, third, and fourth portions 106 of image 100 are illustrated as respectively right sized and focused by microlenses 250, 254, and 258 on an imaging surface of photo-detector array 102. (It is recognized that in side plan view the head and feet of person 202 would appear as lines; however, for sake of clarity they are shown in profile in FIG. 2 to help orient the reader relative to FIG. 1.) Fifth portion 108 is shown as small and faint, and (virtually) misfocused behind an imaging surface of photo-detector array 102, where the misfocusing is due to a deviation of microlens 256. In addition, although not expressly shown herein, those having skill in the art will appreciate that the subject matter of FIG. 2 is also illustrative of those situations in which one or more individual photo-detectors forming part of the imaging surface of photo-detector array 102—rather than one or more microlenses of microlens array 204—deviate from one or more predefined positions by amounts such that image misfocuses/distortions arising from such deviations are unacceptable. That is, insofar as image misfocusing or distortion could just as easily arise from photo-detector array 102 having mispositioned photo-detectors as from microlens array 204 having mispositioned/defective lenses, the subject matter disclosed herein may serve to remedy misfocusings/distortions arising from defects in the imaging surface of photo-detector array 102.

Continuing to refer to FIG. 2, further shown are components that can serve as an environment for the process shown and described in relation to FIG. 3. Specifically, controller 208 is depicted as controlling the position of the various microlenses 250-258 of microlens array 204 of lens system 200 (e.g., via use of one or more feedback control subsystems). Image capture unit 206 is illustrated as receiving image data from photo-detector array 102 and receiving control signals from controller 208. Image capture unit 206 is shown as transmitting captured image information to focus detection unit 210. Focus detection unit 210 is depicted as transmitting focus data to image construction unit 212. Image construction unit 212 is illustrated as transmitting a composite image to image store/display unit 214.

With reference now to FIG. 3, depicted is a high level logic flowchart of a process. Method step 300 shows the start of the process. Method step 302 depicts capturing a primary image with a microlens array having one or more microlenses at one or more primary positions, the microlens array having at least one microlens deviation that exceeds a first tolerance from a target optical property. Examples of the array having at least one microlens deviation that exceeds a first tolerance from a target optical property include (a) where at least one actual microlens position exceeds a first tolerance from at least one defined microlens position, and (b) where at least one microlens of the microlens array has at least one focal length that exceeds a first tolerance from a defined focal length (e.g., a microlens deviation that would produce fifth portion 108 of image 100 at some place behind an imaging surface of photo-detector array 102 or a microlens deviation that would produce portion 104 at some place in front of the imaging surface of photo-detector array 102 where the distance in front or back of the imaging surface exceeds a defined tolerance distance where an image captured with photo-detector array 102 is deemed acceptable). Specific instances of the foregoing include a microlens of the microlens array having at least one spherical aberration that exceeds a first tolerance from a defined spherical aberration, and a microlens of the microlens array having at least one cylindrical aberration that exceeds a first tolerance from a defined cylindrical aberration. Alternatively, the microlens array may have one or more microlenses having some combination of such defects. In one implementation, method step 302 includes the sub-step of capturing the primary image at an average primary focal surface location of the microlens array (e.g., a defined focal surface of the microlens array where an image would form if the microlens array had no microlenses having aberrations outside a specified tolerance). In another implementation, method step 302 includes the sub-step of capturing the primary image with a photo-detector array at the average primary focal surface location of the microlens array (e.g., positioning the microlens array such that a defined focal surface of the microlens array coincides with an imaging surface of a photo-detector array).

Referring again to FIG. 2, one specific example of method step 302 (FIG. 3) would be controller 208 directing lens system 200 to position one or more microlenses of microlens array 204 at one or more primary positions, and thereafter instructing image capture unit 206 to capture an image from photo-detector array 102.

With reference again to FIG. 3, method step 304 illustrates determining at least one out-of-focus region of the primary image (or determining at least one focused region of the primary image). In one implementation, method step 304 includes the sub-step of calculating a Fourier transform of at least a part of the primary image (e.g., sharp, or in-focus images produce abrupt transitions that often have significant high frequency components).

Referring again to FIG. 2, one specific example of method step 304 (FIG. 3) would be focus detection unit 210 performing a Fourier transform and subsequent analysis on at least a part of an image captured by image capture unit 206 when the one or more microlenses of microlens array 204 were at the one or more primary positions. In this example, focus detection unit 210 could deem portions of the image having significant high frequency components as "in focus" images. As a more specific example, the Fourier transform and analysis may be performed on one or more parts of the image that are associated with one or more microlenses 250-258 of microlens array 204.

With reference again to FIG. 3, method step 305 illustrates mapping the at least one out-of-focus region to one or more microlenses of the microlens array. In one implementation, method step 305 includes the sub-steps of projecting mathematically from a surface of a photo-detector to the microlens array; and selecting one or more microlenses of the microlens array in response to said projecting.

Referring again to FIG. 2, one specific example of method step 305 (FIG. 3) would be controller 208 performing a mathematical mapping based on (a) known geometries of microlenses 250-258 relative to photo-detector array 102 and (b) focus/out-of-focus information received from focus detection unit 210. In one exemplary implementation, controller 208 is pre-programmed with knowledge of the position/orientation of photo-detector array 102 and can thus calculate the mathematical projection based on controller 208's positioning of microlenses 250-258. In other exemplary implementations, controller 208 additionally controls and/or monitors the positioning of photo-detector array 102 through one or more control and/or monitoring subsystems, and thus has acquired—rather than pre-programmed—knowledge of the position/orientation of photo-detector array 102 upon which to base the calculations.

With reference again to FIG. 3, method step 306 illustrates moving at least a part of the mapped one or more microlenses of the microlens array to one or more other positions.

Referring again to FIG. 2, one specific example of method step 306 (FIG. 3) would be controller 208 causing a control subsystem of lens system 200 to move one or more individual microlenses 250-258 of microlens array 204. In one exemplary implementation, MEMS control systems and techniques are used. In other exemplary implementations, conventional control systems and techniques are used to effect the movement and control of microlenses 250-258 of microlens array 204.

With reference again to FIG. 3, method step 307 shows capturing another image with the one or more microlenses at the other positions to which they have been moved. In one exemplary implementation, method step 306 includes the sub-step of capturing the other image at the average primary focal surface location of the microlens array with its individual microlenses at their primary positions (e.g., one or more microlenses 250-258 of microlens array 204 are moved, but the image is captured on about the same surface as that upon which the primary image was captured, such as shown and described in relation to FIGS. 4 and 5). In another exemplary implementation, the step of capturing the other image at a primary focal surface location of the microlens array with its individual microlenses at their primary positions further includes the sub-steps of moving at least a part of the microlens array (e.g., at least one microlens) to the other position; and capturing the other image with a photo-detector array which remains stationary at the primary focal surface location of the one or more microlenses at their one or more primary positions (e.g., one or more microlenses 250-258 of microlens array 204 are moved to one or more other positions, while photo-detector array 102 remains stationary, such as shown and described in relation to FIGS. 4 and 5). In another exemplary implementation, the step of moving at least a part of the microlens array to the other position further includes the sub-step of moving the at least a part of the microlens array to the other position within at least one distance constrained by a predefined aberration from at least one defined microlens position.

Figure 3A:
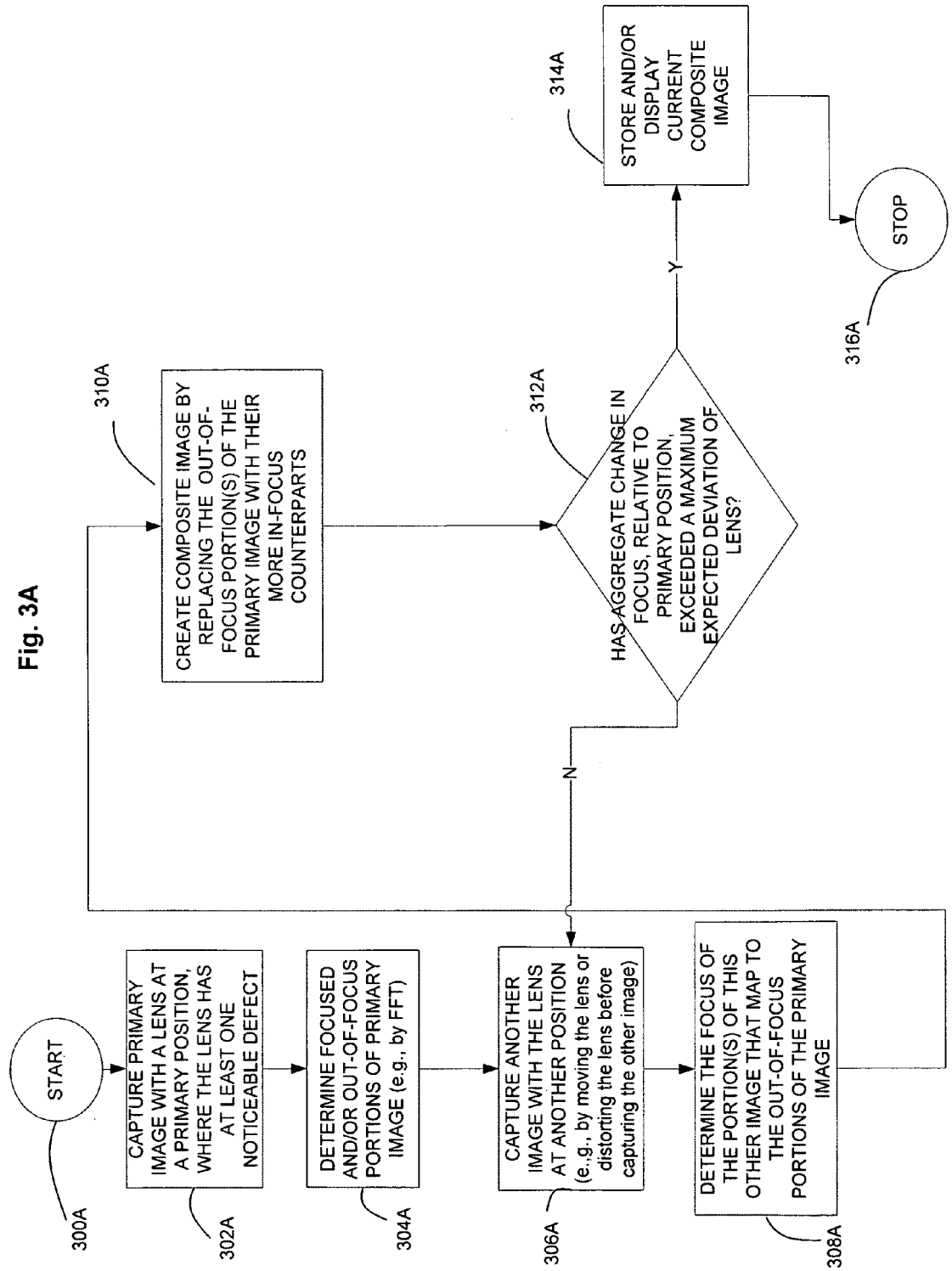
FIG. 3A depicts a high level logic flowchart of a process.
Figure 3B:
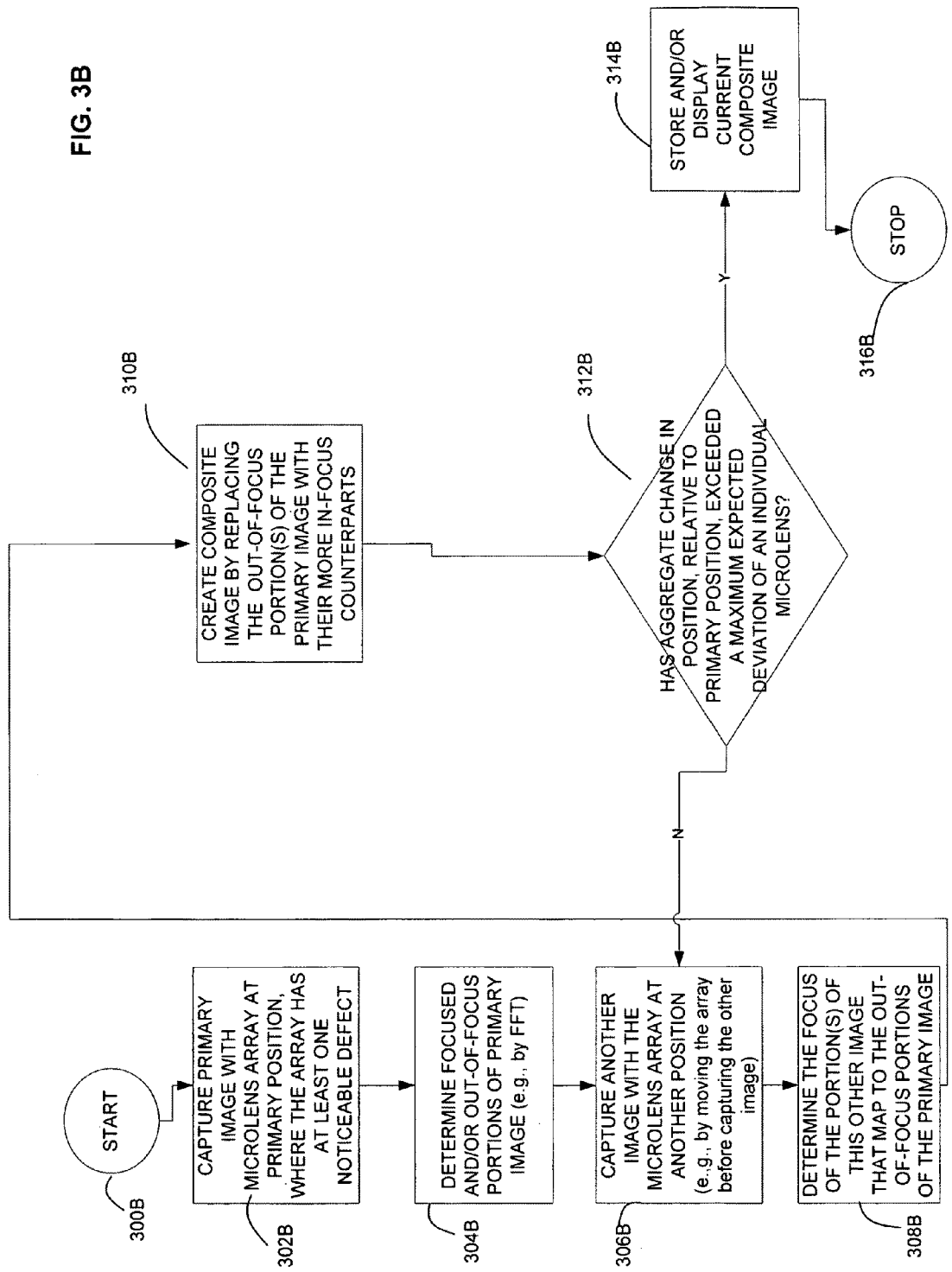
FIG. 3B depicts a high level logic flowchart of a process.
Figure 4:
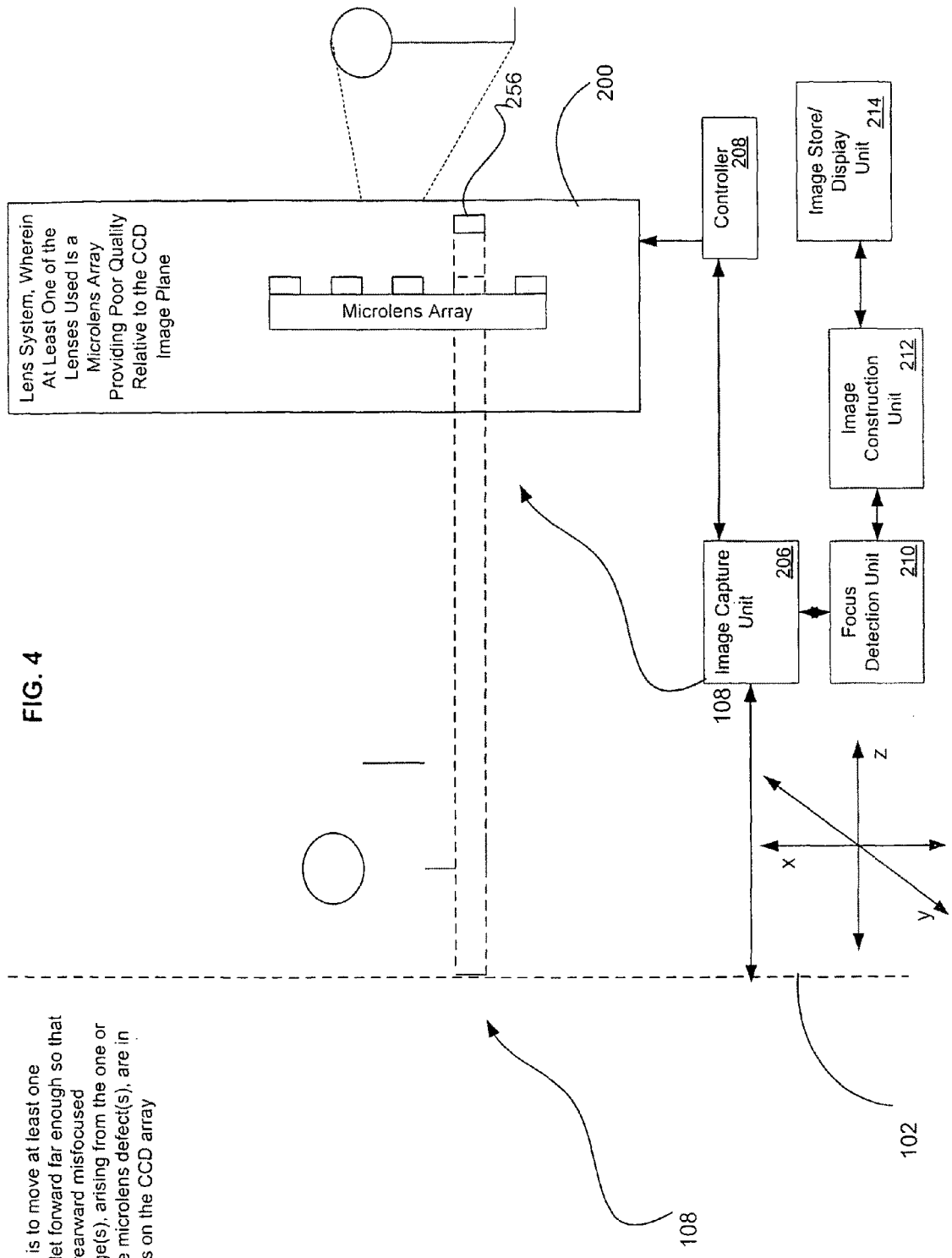
FIG. 4 depicts a side-plan view of the system of FIG. 2 wherein microlens array 204 has been moved in accordance with aspects of the process shown and described in relation to FIG. 3.
Figure 5:
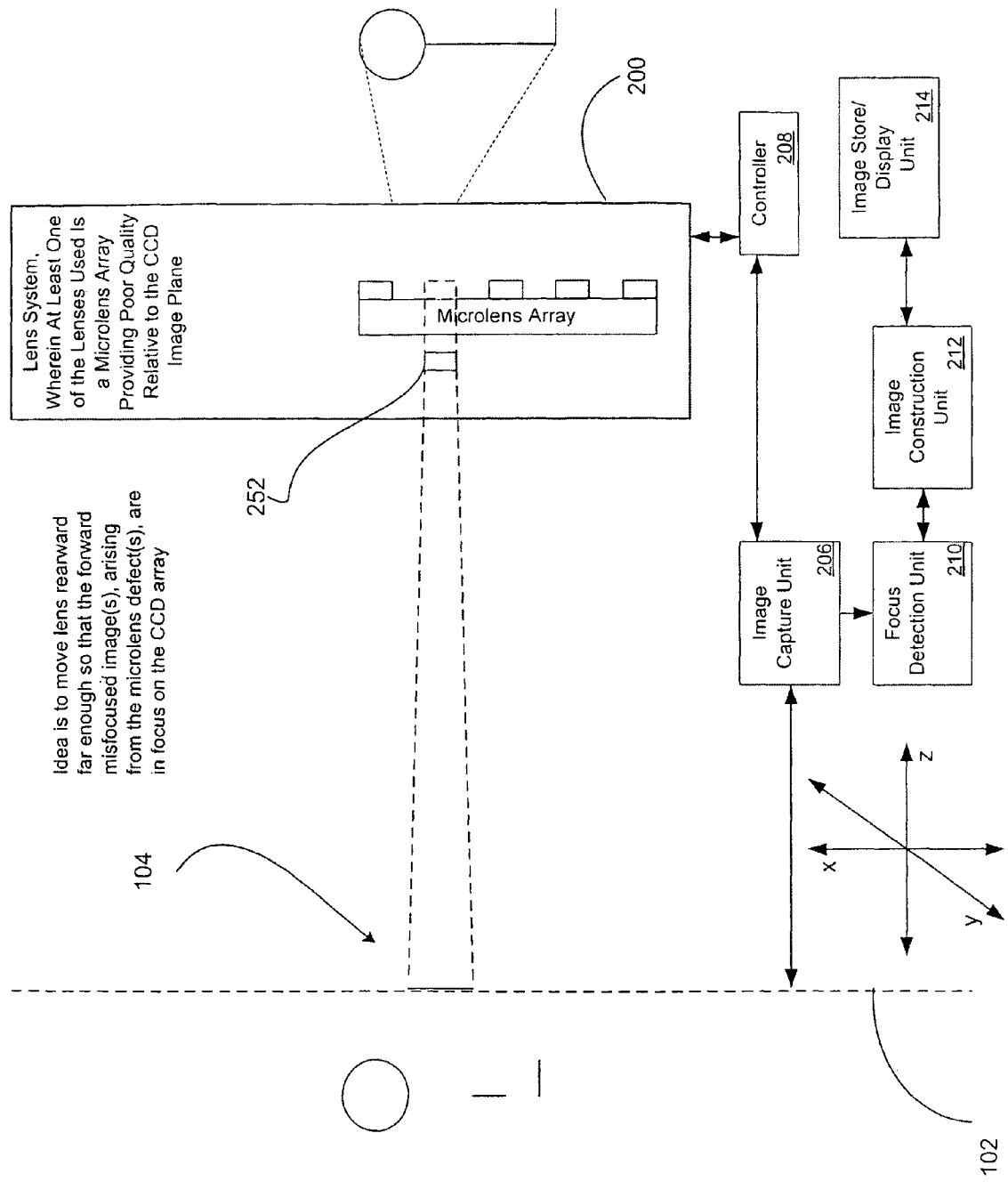
FIG. 5 illustrates another side-plan view of the system of FIG. 2 wherein microlens array 204 has been moved in accordance with aspects of the process shown and described in relation to FIG. 3.

Referring now to FIGS. 2, 4 and/or 5, one specific example of method step 306 (FIG. 3) would be controller 208 directing lens system 200 to position one or more of microlenses 250-258 of microlens array 204 at one or more positions other than their primary positions, and thereafter instructing image capture unit 206 to capture an image from photo-detector array 102. FIG. 4 shows and describes moving at least a portion of microlens array 204 forward of a primary position (e.g., such as by controller 208 causing a MEMS control system to move microlens 256 of microlens array 204 forward relative to an imaging surface of photo-detector array 102, or by causing microlens array 204 to be compressed such that microlens 256 of microlens array 204 moves forward relative to the imaging surface of photo-detector array 102). FIG. 5 shows and describes moving at least a portion of the microlens array rearward of the primary position (e.g., such as by controller 208 causing a MEMS control system to move microlens 252 of microlens array 204 rearward relative to an imaging surface of photo-detector array 102, or by causing microlens array 204 to be compressed such that microlens 252 of microlens array 204 moves rearward relative to an imaging surface of photo-detector array 102).

With reference again to FIG. 3, method step 308 depicts determining a focus of at least one region of the other image relative to a focus of the at least one out-of-focus region of the primary image. In one implementation, method step 308 includes the sub-step of calculating a Fourier transform of at least a part of at least one region of the other image (e.g., sharp or in-focus images produce abrupt transitions that often have significant high frequency components). In one implementation, the step of calculating a Fourier transform of at least a part of at least one region of the other image (e.g., sharp or in-focus images produce abrupt transitions that often have significant high frequency components) includes the sub-step of mapping at least one region of the primary image with at least one region of the other image (e.g., mapping an out-of-focus region of the first image to a corresponding region of the second image). As a more specific example, the Fourier transform and analysis may be performed on one or more parts of the image that are associated with one or more microlenses of the microlens array (e.g., mapping at least one region of the primary image associated with at least one specific microlens against the at least one region of the other image associated with the at least one specific microlens).

Referring again to FIGS. 2, 4 and/or 5, one specific example of method step 308 (FIG. 3) would be focus detection unit 210 performing a Fourier transform and subsequent analysis on at least a part of an image captured by image capture unit 206 when at least one microlens of microlenses 250-258 of microlens array 204 was at the other position specified by controller 208.

With reference again to FIG. 3, method step 310 depicts constructing a composite image in response to the at least one region of the other image having a sharper focus relative to the focus of the at least one out-of-focus region of the primary image. In one implementation, the step of constructing a composite image in response to the at least one region of the other image having a sharper focus relative to the focus of the at least one out-of-focus region of the primary image includes the sub-step of replacing at least a part of the out-of-focus region of the primary image with at least a part of the at least one region of the other image. In yet another implementation, the step of constructing a composite image in response to the at least one region of the other image having a sharper focus relative to the focus of the at least one out-of-focus region of the primary image includes the sub-step of utilizing at least one of tiling image processing techniques, morphing image processing techniques, blending image processing techniques, and stitching image processing techniques.

In yet another implementation, the step of constructing a composite image in response to the at least one region of the other image having a sharper focus relative to the focus of the at least one out-of-focus region of the primary image includes the sub-steps of correlating a feature of the primary image with a feature of the other image; detecting at least one of size, color, and displacement distortion of at least one of the primary image and the other image; correcting the detected at least one of size, color, and displacement distortion of the at least one of the primary image and the other image; and assembling the composite image using the corrected distortion. In yet another implementation, the step of constructing a composite image in response to the at least one region of the other image having a sharper focus relative to the focus of the at least one out-of-focus region of the primary image includes the sub-step of correcting for motion between the primary and the other image.

Referring again to FIGS. 2, 4 and/or 5, one specific example of method step 302 (FIG. 3) would be image construction unit 212 creating a composite image by replacing those portions of an image of person 202 captured at a primary position with more in-focus portions of an image of person 202 captured by image capture unit 206 when microlens array 204 was at the other position. In one implementation of the example, image construction unit 212 corrects for the motion between images using conventional techniques if such correction is desired. In another implementation of the example, motion correction is not used.

With reference again to FIG. 3, method step 312 shows a determination of whether an aggregate change in focus, relative to the primary position of method step 302, has exceeded a maximum expected aberration of at least one lens of the microlens array. For example, even with a relatively poor quality microlens array, there will typically be an upper manufacturing limit beyond which microlens aberrations are not expected to go (e.g., the microlens array has manufacturing criteria such that each microlens in the array provide a focal length of 5 mm+/−0.05 mm).

Referring again to FIGS. 2, 4 and/or 5, one specific example of method step 312 (FIG. 3) would be controller 208 comparing an aggregate movement in a defined direction against a pre-stored upper limit deviation value. In an implementation of the example illustrated in FIG. 4, if microlens array 204 has manufacturing criteria such as a focal length of 5 mm+/−0.05 mm, controller 208 will determine whether the total forward movement of microlens 256 of microlens array 204 is greater than 0.05 mm relative to microlens 256's primary position. In an implementation of the example illustrated in FIG. 5, if microlens array 204 has manufacturing criteria such as a focal length of 5 mm+/−0.05 mm, controller 208 will determine whether the total rearward movement of microlens 252 of microlens array 204 is greater than 0.05 mm relative to microlens 252's primary position.

With reference again to FIG. 3, if the inquiry of method step 312 yields a determination that the aggregate changes in focuses has met or exceeded the maximum expected aberration of at least one lens of the microlens array, the process proceeds to method step 314. Method step 314 illustrates that the current composite image (e.g., of method step 310) is stored and/or displayed. One specific example of method step 314 would be image store/display unit 214 either storing or displaying the composite image.

Method step 316 shows the end of the process.

Returning to method step 312, shown is that in the event that the upper limit on microlens array tolerance of at least one lens of the microlens array has not been met or exceeded, the process proceeds to method step 306 and continues as described herein.

Referring now to FIG. 4, depicted is a side-plan view of the system of FIG. 2 wherein microlens 256 has been moved in accordance with aspects of the process shown and described in relation to FIG. 3. Microlens 256 of lens system 200 is illustrated as having been moved to another position forward of its primary position which gave rise to microlens 256's respective portion of image 100 shown and described in relation to FIGS. 1 and 2. Specifically, microlens 256 of microlens array 204 is illustrated as repositioned such that fifth portion 108 of image 100 is right sized and focused on an imaging surface of photo-detector array 102 (e.g., as shown and described in relation to method step 306). In one implementation, fifth portion 108 of image 100 can be combined with previously captured in focus and right sized portions 106 (e.g., FIGS. 1 and 2) to create a composite image such that the defects associated with fifth portion 108 as shown and described in relation to FIGS. 1 and 2 are alleviated (e.g., as shown and described in relation to method step 310). The remaining components and control aspects of the various parts of FIG. 4 function as described elsewhere herein.

With reference now to FIG. 5, illustrated is another side-plan view of the system of FIG. 2 wherein microlens 252 has been moved in accordance with aspects of the process shown and described in relation to FIG. 3. Microlens 252 of lens system 200 is illustrated as having been moved to another position rearward of its primary position which gave rise microlens 252's respective portion of image 100 shown and described in relation to FIG. 1. Specifically, microlens 252 of microlens array 204 is illustrated as positioned such that first portion 104 of image 100 is right sized and focused on an imaging surface of photo-detector array 102 (e.g., as described in relation to method step 306). In one implementation, first portion 104 of image 100 can be combined with previously captured in focus and right sized portions 106 of FIGS. 1 and 2, 108 of FIG. 4) to create a composite image such that the defects associated with first portion 104 as shown and described in relation to FIGS. 1 and 2 are alleviated (e.g., as shown and described in relation to method step 310). The remaining components and control aspects of the various parts of FIG. 5 function as described elsewhere herein.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will require optically-oriented hardware, software, and or firmware.

The foregoing detailed description has set forth various embodiments of the devices and/or processes via the use of block diagrams, flowcharts, and examples. Insofar as such block diagrams, flowcharts, and examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. In one embodiment, the present invention may be implemented via Application Specific Integrated Circuits (ASICs), Field Programmable Gate Arrays (FPGAs), or other integrated formats. However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the present invention are capable of being distributed as a program product in a variety of forms, and that an illustrative embodiment of the present invention applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various embodiments described herein which can be implemented, individually and/or collectively, by various types of electro-mechanical systems having a wide range of electrical components such as hardware, software, firmware, or virtually any combination thereof; and a wide range of components that may impart mechanical force or motion such as rigid bodies, spring or torsional bodies, hydraulics, and electro-magnetically actuated devices, or virtually any combination thereof. Consequently, as used herein "electro-mechanical system" includes, but is not limited to, electrical circuitry operably coupled with a transducer (e.g., an actuator, a motor, a piezoelectric crystal, etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), electrical circuitry forming a communications device (e.g., a modem, communications switch, or optical-electrical equipment), and any non-electrical analog thereto, such as optical or other analogs. Those skilled in the art will also appreciate that examples of electro-mechanical systems include but are not limited to a variety of consumer electronics systems, as well as other systems such as motorized transport systems, factory automation systems, security systems, and communication/computing systems. Those skilled in the art will recognize that electro-mechanical as used herein is not necessarily limited to a system that has both electrical and mechanical actuation except as context may dictate otherwise.

Those skilled in the art will recognize that it is common within the art to describe devices and/or processes in the fashion set forth herein, and thereafter use standard engineering practices to integrate such described devices and/or processes into image processing systems. That is, at least a portion of the devices and/or processes described herein can be integrated into an image processing system via a reasonable amount of experimentation. Those having skill in the art will recognize that a typical image processing system generally includes one or more of a system unit housing, a video display device, a memory such as volatile and non-volatile memory, processors such as microprocessors and digital signal processors, computational entities such as operating systems, drivers, and applications programs, one or more interaction devices, such as a touch pad or screen, control systems including feedback loops and control motors (e.g., feedback for sensing lens position and/or velocity; control motors for moving/distorting lenses to give desired focuses. A typical image processing system may be implemented utilizing any suitable commercially available components, such as those typically found in digital still systems and/or digital motion systems.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality.

While particular embodiments of the present invention have been shown and described, it will be understood by those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," "comprise" and variations thereof, such as, "comprises" and "comprising" are to be construed in an open, inclusive sense, that is as "including, but not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

II. Lens Defect Correction

With reference to the figures, and with reference now to FIG. 1A, shown is a front-plan view of image 100A of a person (e.g., person 202A of FIG. 2A) projected onto photo-detector array 102A. Image 100A is shown as distorted due to defects in a lens through which image 100A has been projected (e.g., lens 204A of lens system 200A of FIG. 2A). First portion 104A of image 100A is illustrated as large and blurry, which can occur when a lens defect causes portion 104A of image 100A to come to a focus in front of a surface of photo-detector array 102A. Second, third, and fourth portions 106A are illustrated as right sized, which can occur when the lens causes portions 106A of image 100A to correctly focus on an imaging surface of photo-detector array 102A. Fifth portion 108A is shown as small and faint, which can occur when a lens defect causes portion 108A of image 100A to come to a focus (virtual) behind an imaging surface of photo-detector array 102A. In addition, although not expressly shown, those having skill in the art will appreciate that various lens defects could also cause the image to be distorted in x-y; those having skill in the art will also appreciate that different colored wavelengths of light can in and of themselves focus at different positions due to differences in refraction of the different colored wavelengths of light.

Figure 2A:
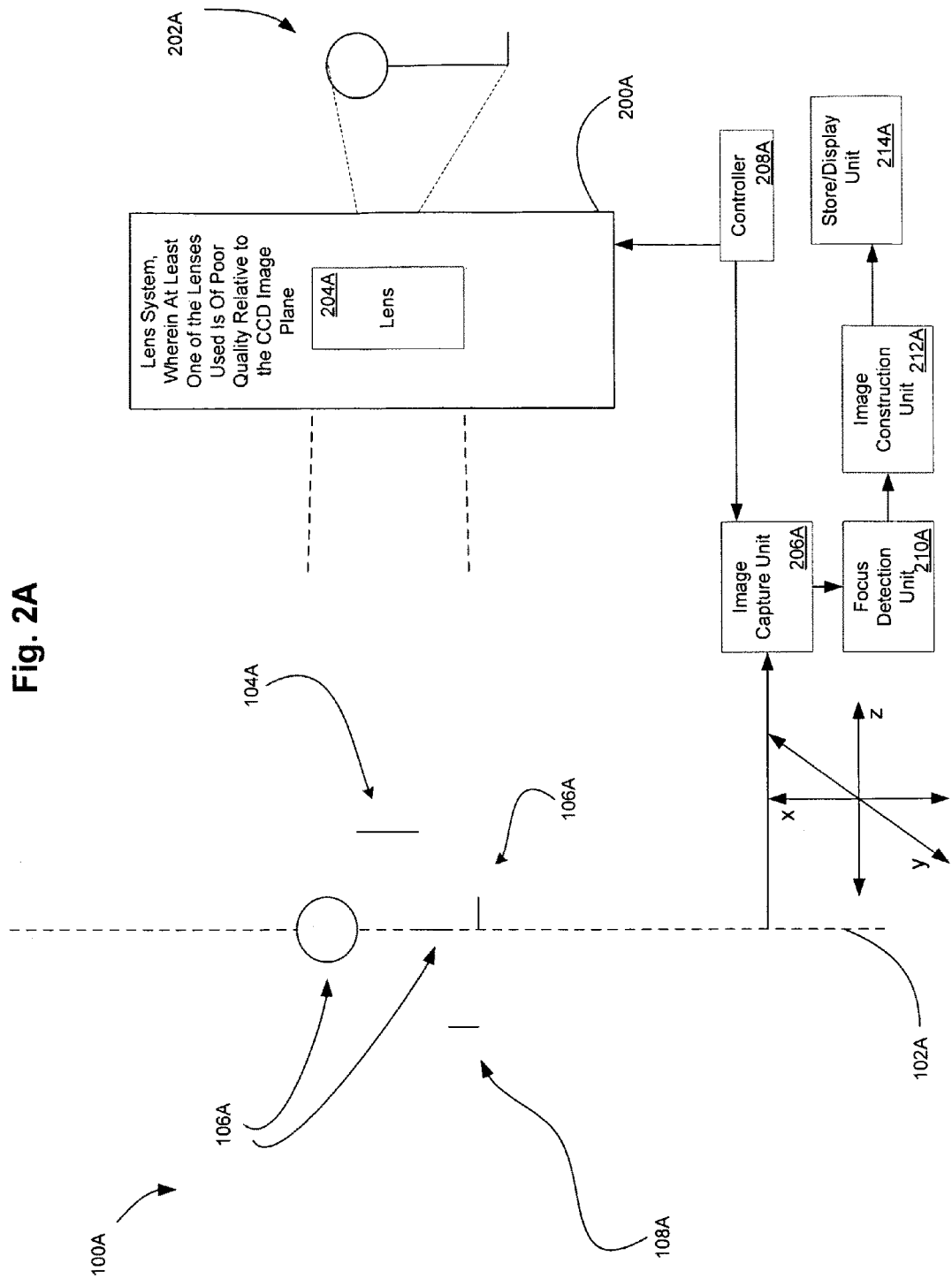
FIG. 2A depicts a side-plan view of lens system 200A that can give rise to image 100A of FIG. 1A.

Referring now to FIG. 2A, depicted is a side-plan view of lens system 200A that can give rise to image 100A of FIG. 1A. Lens 204A of lens system 200A is illustrated as located at a primary position and having defects that give rise to the five different portions of image 100A shown and described in relation to FIG. 1A. First portion 104A of image 100A is illustrated as focused in front of an imaging surface of photo-detector array 102A. Second, third, and fourth portions 106A are illustrated as right sized and focused on an imaging surface of photo-detector array 102A. (It is recognized that in side plan view the head and feet of person 202A would appear as lines; however, for sake of clarity they are shown in profile in FIG. 2A to help orient the reader relative to FIG. 1A.) Fifth portion 108A is shown as small and faint, and virtually focused behind an imaging surface of photo-detector array 102A.

Continuing to refer to FIG. 2A, further shown are components that can serve as the environment for the process shown and described in relation to FIG. 3A. Specifically, controller 208A is depicted as controlling the position of lens 204A of lens system 200A (e.g., via use of a feedback control subsystem). Image capture unit 206A is illustrated as receiving image data from photo-detector 102A and receiving control signals from controller 208A. Image capture unit 206A is shown as transmitting captured image information to focus detection unit 210A. Focus detection unit 210A is depicted as transmitting focus data to image construction unit 212A. Image construction unit 212A is illustrated as transmitting a composite image to image store/display unit 214A.

With reference now to FIG. 3A, depicted is a high level logic flowchart of a process. Method step 300A shows the start of the process. Method step 302A depicts capturing a primary image with a lens at a primary position, the lens having at least one deviation that exceeds a first tolerance from a target optical property. One example of the lens having at least one deviation that exceeds a first tolerance from a target optical property would be where the lens has at least one focal length that exceeds a first tolerance from a defined focal length (e.g., a defect that would produce portion 108A of image 100A at some place behind an imaging surface of photo-detector 102A or a defect that would produce portion 104A at some place in front of the imaging surface of photo-detector array 102A where the distance in front or back of the imaging surface exceeds a defined tolerance distance where an image captured with the photo-detector array 102A is deemed acceptable). For instance, the lens may have at least one spherical aberration that exceeds a first tolerance from a defined spherical aberration, or the lens may have at least one cylindrical aberration that exceeds a first tolerance from a defined cylindrical aberration. Alternatively, the lens may have some combination of such defects. In one implementation, method step 302A includes the sub-step of capturing the primary image at a primary focal surface location of the lens (e.g., a defined focal surface of the lens where an image would form if the lens had no aberrations). In another implementation, method step 302A includes the sub-step of capturing the primary image with a photo-detector array at the primary focal surface location of the lens (e.g., positioning the lens such that a defined focal surface of the lens coincides with an imaging surface of a photo-detector array).

Referring again to FIG. 2A, one specific example of method step 302A (FIG. 3A) would be controller 208A directing lens system 200A to position lens 204A at a primary position, and thereafter instructing image capture unit 100A to capture an image from photo-detector 102A.

With reference again to FIG. 3A, method step 304A illustrates determining at least one out-of-focus region of the primary image (or determining at least one focused region of the primary image). In one implementation, method step 304A includes the sub-step of calculating a Fourier transform of at least a part of the primary image (e.g., sharp, or in-focus images produce abrupt transitions that often have significant high frequency components).

Referring again to FIG. 2A, one specific example of method step 304A (FIG. 3A) would be focus detection unit 210A performing a Fourier transform and subsequent analysis on at least a part of an image captured by image capture unit 206A when lens 204A was at the primary position. In this example, focus detection unit 210A could deem portions of the image having significant high frequency components as "in focus" images.

With reference again to FIG. 3A, method step 306A shows capturing another image with the lens at another position. In one implementation, method step 306A includes the sub-step of capturing the other image at the primary focal surface location of the lens at the primary position (e.g., lens 204A is moved to another position, while photo-detector 102A remains stationary, such as shown and described in relation to FIGS. 4A and 5A). In another implementation, the step of capturing the other image at a primary focal surface location of the lens at the primary position further includes the sub-step of moving at least a part of the lens to the other position; and capturing the other image with a photo-detector array at the primary focal surface location of the lens at the primary position. In another implementation, the step of moving at least a part of the lens to the other position further includes the sub-step of moving the at least a part of the lens to the other position within at least one distance constrained by the first tolerance from the target optical property. In another implementation, the step of moving at least a part of the lens to the other position further includes the sub-step of moving an intermediary lens. In another implementation, the step of moving at least a part of the lens to the other position further includes the sub-step of distorting the lens such that the at least a part of the lens resides at the other position (e.g., a part of lens 204A is moved to another position, such as might happen if lens 204A were to be compressed laterally in a controlled manner, while photo-detector 102A remains stationary, such as shown and described in relation to FIGS. 4A and 5A).

Figure 4A:
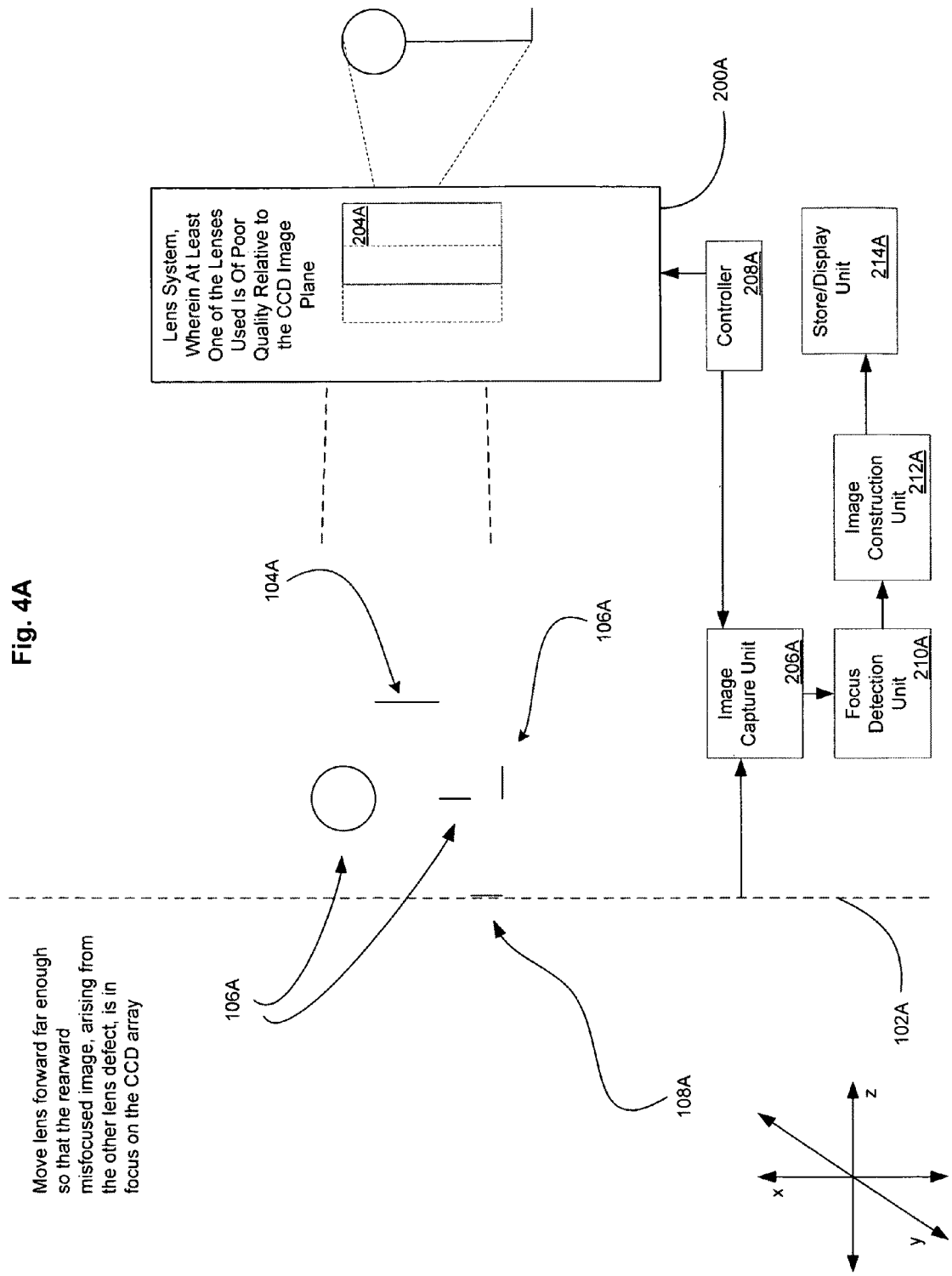
FIG. 4A depicts a side-plan view of the system of FIG. 2A wherein lens 204A has been moved in accordance with aspects of the process shown and described in relation to FIG. 3A.

Referring now to FIGS. 2A, 4A and/or 5A, one specific example of method step 306A (FIG. 3A) would be controller 208A directing lens system 200A to position lens 204A at a position other than the primary position and thereafter instructing image capture unit 100A to capture an image from photo-detector 102A. FIG. 4A shows and describes moving at least a portion of the lens forward of the primary position (e.g., such as by controller 208A moving lens 204A forward, or causing lens 204A to be compressed such that a part of lens 204A moves forward relative to an imaging surface of photo-detector 102A). FIG. 5A shows and describes moving at least a portion of the lens rearward of the primary position (e.g., such as by controller 208A moving lens 204A forward, or causing lens 204A to be compressed such that a part of lens 204A moves rearward relative to an imaging surface of photo-detector 102A).

With reference again to FIG. 3A, method step 308A depicts determining a focus of at least one region of the other image relative to a focus of the at least one out-of-focus region of the primary image. In one implementation, method step 310A includes the sub-step of calculating a Fourier transform of at least a part of at least one region of the other image (e.g., sharp or in-focus images produce abrupt transitions that often have significant high frequency components). In one implementation, the step of calculating a Fourier transform of at least a part of at least one region of the other image (e.g., sharp or in-focus images produce abrupt transitions that often have significant high frequency components) includes the sub-step of mapping at least one region of the primary image with at least one region of the other image (e.g., mapping an out-of-focus region of the first image to a corresponding region of the second image).

Referring again to FIGS. 2A, 4A and/or 5A, one specific example of method step 302A (FIG. 3A) would be focus detection unit 210A performing a Fourier transform and subsequent analysis on at least a part of an image captured by image capture unit 206A when lens 204A was at the other position specified by controller 208A.

With reference again to FIG. 3A, method step 310A depicts constructing a composite image in response to the at least one region of the other image having a sharper focus relative to the focus of the at least one out-of-focus region of the primary image. In one implementation, the step of constructing a composite image in response to the at least one region of the other image having a sharper focus relative to the focus of the at least one out-of-focus region of the primary image includes the sub-step of replacing at least a part of the out-of-focus region of the primary image with at least a part of the at least one region of the other image. In another implementation, the step of constructing a composite image in response to the at least one region of the other image having a sharper focus relative to the focus of the at least one out-of-focus region of the primary image includes the sub-step of replacing at least a part of the out-of-focus region of the primary image with at least a part of the at least one region of the other image. In yet another implementation, the step of constructing a composite image in response to the at least one region of the other image having a sharper focus relative to the focus of the at least one out-of-focus region of the primary image includes the sub-step of utilizing at least one of tiling image processing techniques, morphing image processing techniques, blending image processing techniques, and stitching image processing techniques.

In yet another implementation, the step of constructing a composite image in response to the at least one region of the other image having a sharper focus relative to the focus of the at least one out-of-focus region of the primary image includes the sub-steps of correlating a feature of the primary image with a feature of the other image; detecting at least one of size, color, and displacement distortion of at least one of the primary image and the other image; correcting the detected at least one of size, color, and displacement distortion of the at least one of the primary image and the other image; and assembling the composite using the corrected distortion. In yet another implementation, the step of constructing a composite image in response to the at least one region of the other image having a sharper focus relative to the focus of the at least one out-of-focus region of the primary image includes the sub-step of correcting for motion between the primary and the other image.

Referring again to FIGS. 2A, 4A and/or 5A, one specific example of method step 302A (FIG. 3A) would be image construction unit 212A creating a composite image by replacing those portions of an image of person 202A captured at a primary position with more in-focus positions of an image of person 202A captured by image capture unit 206A when lens 204A was at the other position. In one implementation of the example, image construction unit 212A corrects for the motion between images using conventional techniques if such correction is desired. In another implementation of the example, motion correction is not used.

With reference again to FIG. 3A, method step 312A shows a determination of whether an aggregate change in focus, relative to the primary position of method step 302A, has exceeded a maximum expected deviation of a lens. For example, even with a relatively poor quality lens, there will typically be an upper manufacturing limit beyond which lens defects are not expected to go (e.g., the lens has manufacturing criteria such as a focal length of 5 mm+/−0.05 mm).

Referring again to FIGS. 2A, 4A and/or 5A, one specific example of method step 312A (FIG. 3A) would be controller 208A comparing an aggregate movement in a defined direction against a pre-stored upper limit deviation value. In an implementation of the example illustrated in FIG. 4A, if lens 204A has manufacturing criteria such as a focal length of 5 mm+/−0.05 mm, controller 208A will determine whether the total forward movement of the lens is greater than 0.05 mm relative to the primary position. In an implementation of the example illustrated in FIG. 5A, if lens 204A has manufacturing criteria such as a focal length of 5 mm+/−0.05 mm, controller 208A will determine whether the total rearward movement of the lens is greater than 0.05 mm relative to the primary position.

With reference again to FIG. 3A, if the inquiry of method step 312A yields a determination that the aggregate changes in focuses has met or exceeded the maximum expected deviation of the lens, the process proceeds to method step 314A. Method step 314A illustrates that the current composite image (e.g., of method step 310A) is stored and/or displayed. One specific example of method step 314A would be store/display unit 214A either storing or displaying the composite image.

Method step 316A shows the end of the process.

Returning to method step 312A, shown is that in the event that the upper limit on lens tolerance has not been met or exceeded, the process proceeds to method step 306A and continues as described herein.

Referring now to FIG. 4A, depicted is a side-plan view of the system of FIG. 2A wherein lens 204A has been moved in accordance with aspects of the process shown and described in relation to FIG. 3A. Lens 204A of lens system 200A is illustrated as having been moved to another position forward of the primary position which gave rise to the five different portions of image 100A shown and described in relation to FIGS. 1A and 2A. Specifically, lens 204A of lens system 200A is illustrated as repositioned such that fifth portion 108A of image 100A is right sized and focused on an imaging surface of photo-detector array 102A (e.g., as shown and described in relation to method step 306A). In one implementation, fifth portion 108A of image 100A can be combined with previously captured in focus and right sized portions 106A (e.g., FIGS. 1A and 2A) to create a composite image such that the defects associated with fifth portion 108A as shown and described in relation to FIGS. 1A and 2A are alleviated (e.g., as shown and described in relation to method step 310A). The remaining components and control aspects of the various parts of FIG. 4A function as described elsewhere herein.

With reference now to FIG. 5A, illustrated is another side-plan view of the system of FIG. 2A wherein lens 204A has been moved in accordance with aspects of the process shown and described in relation to FIG. 3A. Lens 204A of lens system 200A is illustrated as having been moved to another position rearward of the primary position which gave rise to the five different portions of image 100A shown and described in relation to FIG. 1A. Specifically, lens 204A of lens system 200A is illustrated as positioned such that first portion 104A of image 100A is right sized and focused on an imaging surface of photo-detector array 102A (e.g., as described in relation to method step 306A). In one implementation, first portion 104A of image 100A can be combined with previously captured in focus and right sized portions 106A, 108A (e.g., FIGS. 1A, 2A, and 4A) to create a composite image such that the defects associated with first portion 104A as shown and described in relation to FIGS. 1A and 2A are alleviated (e.g., as shown and described in relation to method step 310A). The remaining components and control aspects of the various parts of FIG. 5A function as described elsewhere herein.

III. Image Correction Using a Microlens Array as a Unit

With reference to the figures, and with reference now to FIG. 1B, shown is a front-plan view of image 100B of a person (e.g., person 202B of FIG. 2B) projected onto photo-detector array 102B. Image 100B is shown as distorted due to defects in a microlens array through which image 100B has been projected (e.g., microlens array 204B of lens system 200B of FIG. 2B). First portion 104B of image 100B is illustrated as large and blurry, which can occur when a microlens deviation causes first portion 104B of image 100B to come to a focus in front of an imaging surface of photo-detector array 102B. Second, third, and fourth portions 106B of image 100B are illustrated as right sized, which can occur when microlenses of the microlens array cause portions 106B to correctly focus on an imaging surface of photo-detector array 102B. Fifth portion 108B of image 100B is shown as small and faint, which can occur when a microlens deviation causes fifth portion 108B to come to a focus (virtual) behind an imaging surface of photo-detector array 102B. In addition, although not expressly shown, those having skill in the art will appreciate that various microlens defects could also cause the image to be distorted in x-y; those having skill in the art will also appreciate that different colored wavelengths of light can in and of themselves focus at different positions due to differences in refraction of the different colored wavelengths of light. In addition, although not expressly shown herein, those having skill in the art will appreciate that the subject matter disclosed herein may serve to remedy misfocusings/distortions arising from defects other than lens defects, such as, for example, defects in the imaging surface of photo-detector array 102B and/or defects in frames that hold microlens arrays.

Figure 2B:
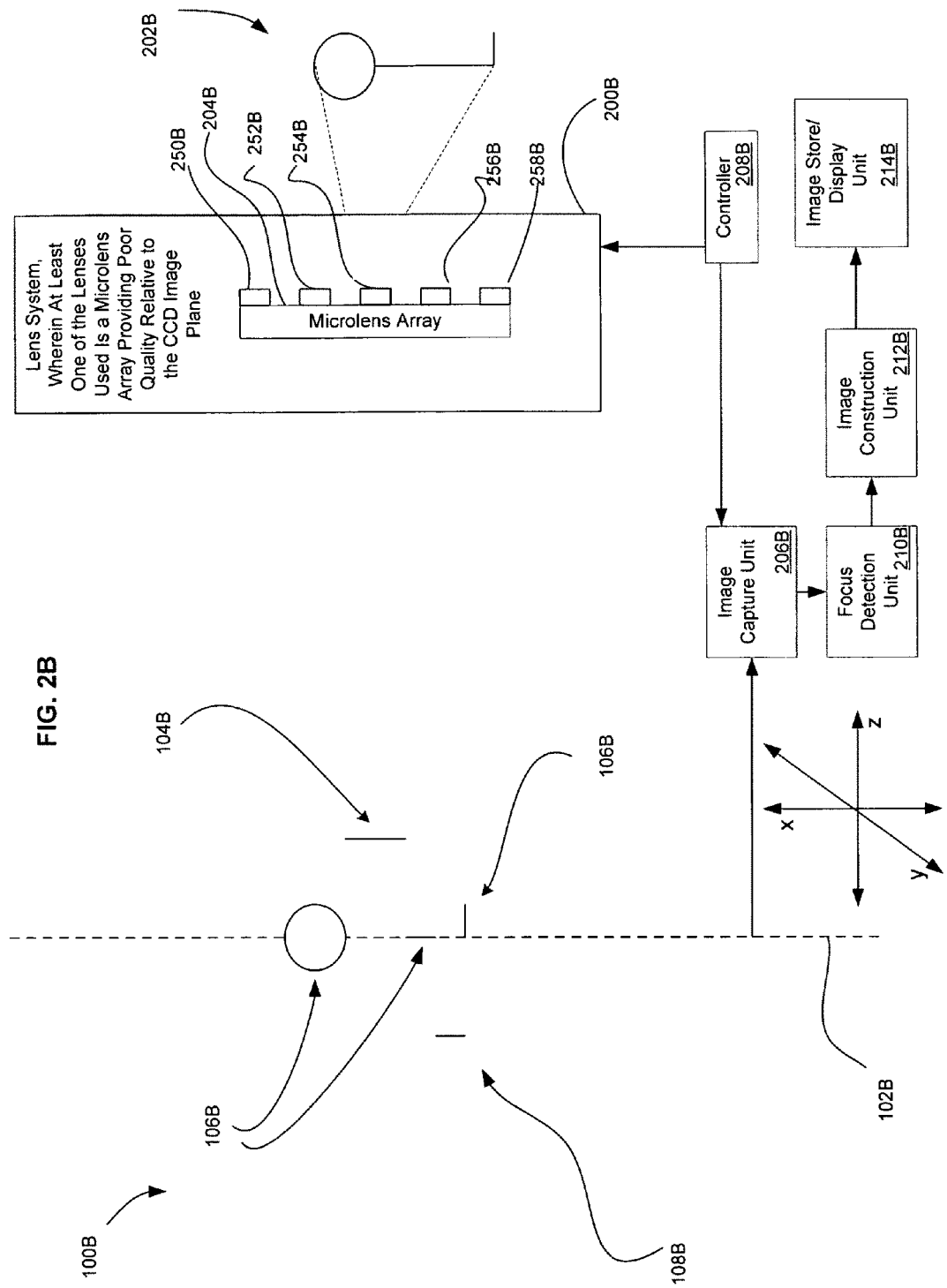
FIG. 2B depicts a side-plan view of lens system 200B that can give rise to image 100B of FIG. 1B.

Referring now to FIG. 2B, depicted is a side-plan view of lens system 200B that can give rise to image 100B of FIG. 1B. Microlens array 204B of lens system 200B is illustrated as located at a primary position and having microlens deviations that give rise to the five different portions of image 100B shown and described in relation to FIG. 1B. First portion 104B of image 100B is illustrated as misfocused in front of an imaging surface of photo-detector array 102B, where the misfocus is due to a deviation of microlens 252B. Second, third, and fourth portions 106B of image 100B are illustrated as respectively right sized and focused by microlenses 250B, 254B, and 258B on an imaging surface of photo-detector array 102B. (It is recognized that in side plan view the head and feet of person 202B would appear as lines; however, for sake of clarity they are shown in profile in FIG. 2B to help orient the reader relative to FIG. 1B.) Fifth portion 108B is shown as small and faint, and virtually misfocused behind an imaging surface of photo-detector array 102B, where the misfocus is due to a deviation of microlens 256B. In addition, although not expressly shown herein, those having skill in the art will appreciate that the subject matter of FIG. 2B is also illustrative of those situations in which one or more individual photo-detectors forming part of the imaging surface of photo-detector array 102B—rather than one or more microlenses of microlens array 204B—deviate from one or more predefined positions by amounts such that image misfocuses/distortions arising from such deviations are unacceptable. That is, insofar as image misfocusing and/or distortion could just as easily arise from photo-detector array 102B having mispositioned photo-detectors as from microlens array 204B having mispositioned/defective lenses, the subject matter disclosed herein may serve to remedy misfocusings/distortions arising from defects in the imaging surface of photo-detector array 102B.

Continuing to refer to FIG. 2B, further shown are components that can serve as an environment for the process shown and described in relation to FIG. 3B. Specifically, controller 208B is depicted as controlling the position of microlens array 204B of lens system 200B (e.g., via use of a feedback control subsystem). Image capture unit 206B is illustrated as receiving image data from photo-detector array 102B and receiving control signals from controller 208B. Image capture unit 206B is shown as transmitting captured image information to focus detection unit 210B. Focus detection unit 210B is depicted as transmitting focus data to image construction unit 212B. Image construction unit 212B is illustrated as transmitting a composite image to image store/display unit 214B.

With reference now to FIG. 3B, depicted is a high level logic flowchart of a process. Method step 300B shows the start of the process. Method step 302B depicts capturing a primary image with a microlens array at a primary position, the microlens array having at least one microlens deviation that exceeds a first tolerance from a target optical property. Examples of the array having at least one microlens deviation that exceeds a first tolerance from a target optical property include (a) where at least one microlens position exceeds a first tolerance from at least one defined microlens position, and (b) where at least one microlens of the microlens array has at least one focal length that exceeds a first tolerance from a defined focal length (e.g., a microlens deviation that would produce portion 108B of image 100B at some place behind an imaging surface of photo-detector array 102B or a microlens deviation that would produce portion 104B at some place in front of the imaging surface of photo-detector array 102B where the distance in front or back of the imaging surface exceeds a defined tolerance distance where an image captured with the photo-detector array 102B is deemed acceptable). Specific instances of the foregoing include a microlens of the microlens array having at least one spherical aberration that exceeds a first tolerance from a defined spherical aberration, and a microlens of the microlens array having at least one cylindrical aberration that exceeds a first tolerance from a defined cylindrical aberration. Alternatively, the microlens array may have some combination of microlenses having such defects. In one implementation, method step 302B includes the sub-step of capturing the primary image at an average primary focal surface location of the microlens array (e.g., a defined focal surface of the microlens array where an image would form if the microlens array had no microlenses having aberrations outside a specified tolerance). In another implementation, method step 302B includes the sub-step of capturing the primary image with a photo-detector array at the average primary focal surface location of the microlens array (e.g., positioning the microlens array such that a defined focal surface of the lens coincides with an imaging surface of a photo-detector array).

Referring again to FIG. 2B, one specific example of method step 302B (FIG. 3B) would be controller 208B directing lens system 200B to position microlens array 204B at a primary position, and thereafter instructing image capture unit 206B to capture an image from photo-detector array 102B.

With reference again to FIG. 3B, method step 304B illustrates determining at least one out-of-focus region of the primary image (or determining at least one focused region of the primary image). In one implementation, method step 304B includes the sub-step of calculating a Fourier transform of at least a part of the primary image (e.g., sharp, or in-focus images produce abrupt transitions that often have significant high frequency components).

Referring again to FIG. 2B, one specific example of method step 304B (FIG. 3B) would be focus detection unit 210B performing a Fourier transform and subsequent analysis on at least a part of an image captured by image capture unit 206B when lens 204B was at the primary position. In this example, focus detection unit 210B could deem portions of the image having significant high frequency components as "in focus" images. As a more specific example, the Fourier transform and analysis may be performed on one or more parts of the image that are associated with one or more microlenses 250B-258B of microlens array 204B.

With reference again to FIG. 3B, method step 306B shows capturing another image with the microlens array at another position. In one implementation, method step 306B includes the sub-step of capturing the other image at the average primary focal surface location of the microlens array at the primary position. In another implementation, the step of capturing the other image at a primary focal surface location of the microlens array at the primary position further includes the sub-step of moving at least a part of the microlens array to the other position; and capturing the other image with a photo-detector array at the primary focal surface location of the microlens at the primary position (e.g., microlens array 204B is moved to another position, while photo-detector array 102B remains stationary, such as shown and described in relation to FIGS. 4B and 5B). In another implementation, the step of moving at least a part of the microlens array to the other position further includes the sub-step of moving the at least a part of the microlens array to the other position within at least one distance constrained by a predefined variation from at least one defined microlens position. In another implementation, the step of moving at least a part of the microlens array to the other position further includes the sub-step of moving an intermediary lens. In another implementation, the step of moving at least a part of the microlens array to the other position further includes the sub-step of distorting the microlens array such that the at least a part of the microlens array resides at the other position (e.g., a part of microlens array 204B is moved to another position, such as might happen if microlens array 204B were to be compressed laterally in a controlled manner, while photo-detector array 102B remains stationary, such as shown and described in relation to FIGS. 4B and 5B).

Figure 4B:
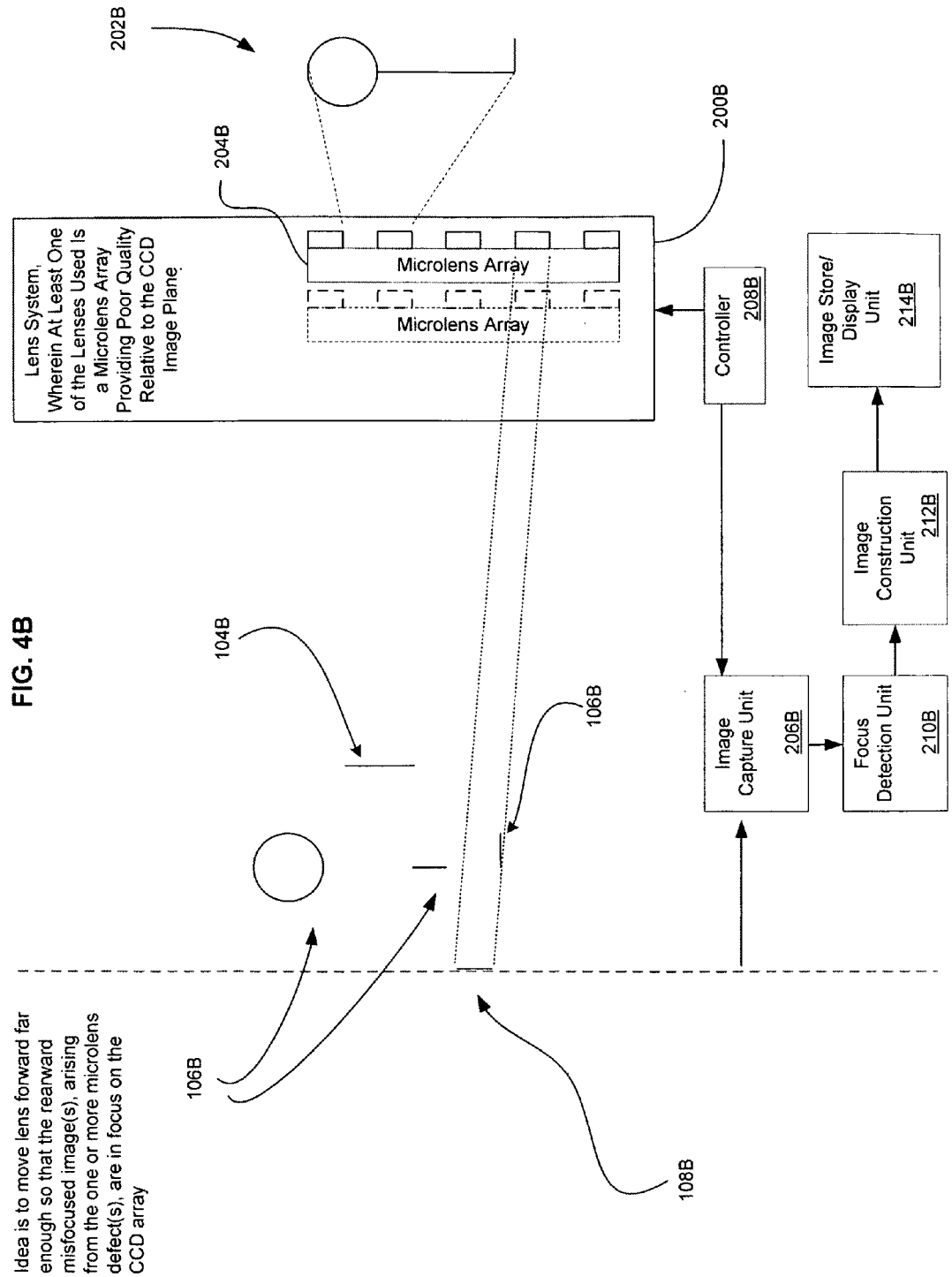
FIG. 4B depicts a side-plan view of the system of FIG. 2B wherein microlens array 204B has been moved in accordance with aspects of the process shown and described in relation to FIG. 3B.
Figure 5B:
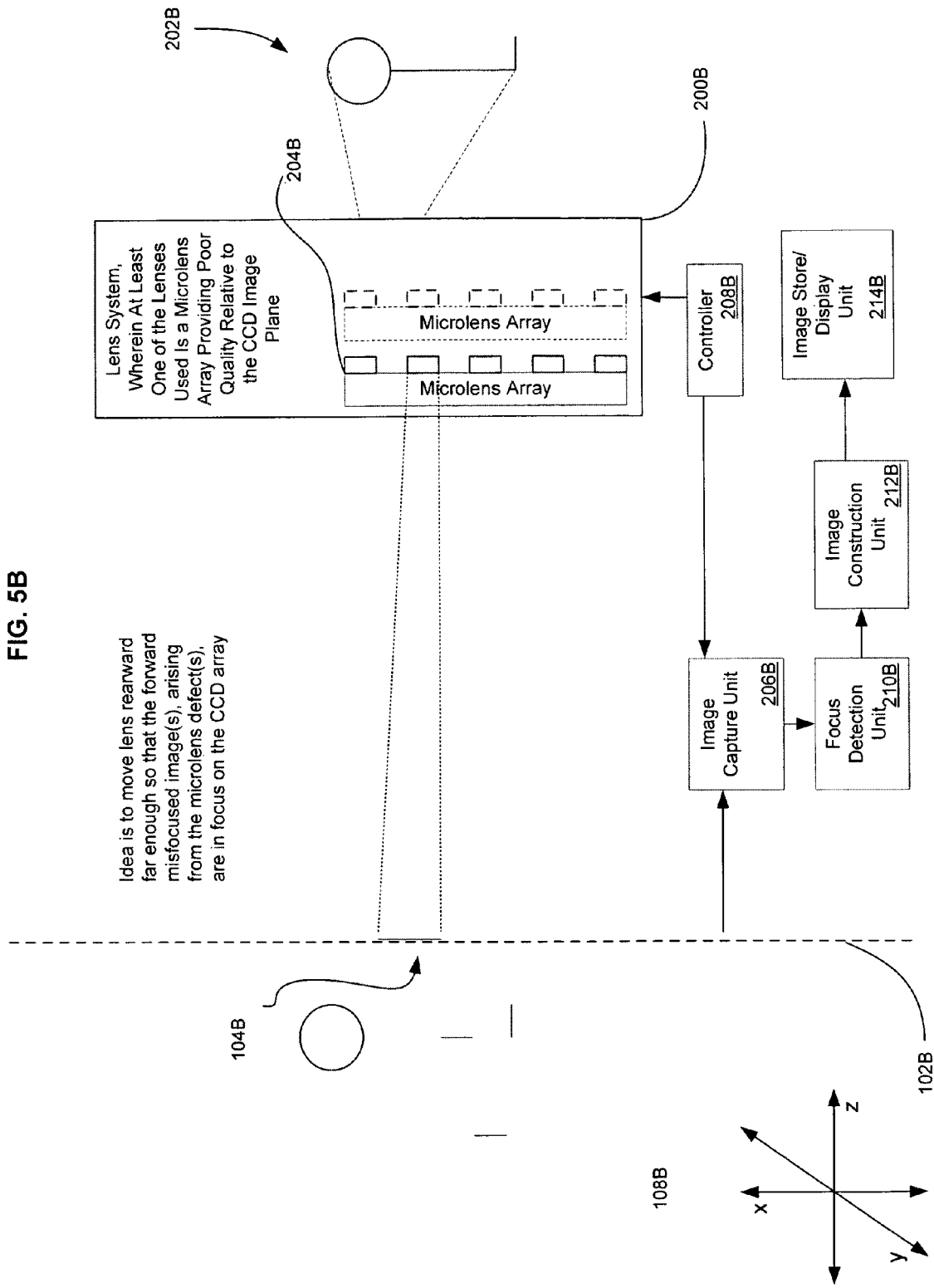
FIG. 5B illustrates another side-plan view of the system of FIG. 2B wherein microlens array 204B has been moved in accordance with aspects of the process shown and described in relation to FIG. 3B.

Referring now to FIGS. 2B, 4B and/or 5B, one specific example of method step 306B (FIG. 3B) would be controller 208B directing lens system 200B to position microlens array 204B at a position other than the primary position and thereafter instructing image capture unit 206B to capture an image from photo-detector array 102B. FIG. 4B shows and describes moving at least a portion of microlens array 204B forward of the primary position (e.g., such as by controller 208B moving microlens array 204B forward, or causing microlens array 204B to be compressed such that a part of microlens array 204B moves forward relative to an imaging surface of photo-detector array 102B). FIG. 5B shows and describes moving at least a portion of the microlens array rearward of the primary position (e.g., such as by controller 208B moving microlens array 204B rearward, or causing microlens array 204B to be compressed such that a part of microlens array 204B moves rearward relative to an imaging surface of photo-detector array 102B).

With reference again to FIG. 3B, method step 308B depicts determining a focus of at least one region of the other image relative to a focus of the at least one out-of-focus region of the primary image. In one implementation, method step 308B includes the sub-step of calculating a Fourier transform of at least a part of at least one region of the other image (e.g., sharp or in-focus images produce abrupt transitions that often have significant high frequency components). In one implementation, the step of calculating a Fourier transform of at least a part of at least one region of the other image (e.g., sharp or in-focus images produce abrupt transitions that often have significant high frequency components) includes the sub-step of mapping at least one region of the primary image with at least one region of the other image (e.g., mapping an out-of-focus region of the first image to a corresponding region of the second image). As a more specific example, the Fourier transform and analysis may be performed on one or more parts of the image that are associated with one or more microlenses of the microlens array (e.g., mapping at least one region of the primary image associated with at least one specific microlens against the at least one region of the other image associated with the at least one specific microlens).

Referring again to FIGS. 2B, 4B and/or 5B, one specific example of method step 308B (FIG. 3B) would be focus detection unit 210B performing a Fourier transform and subsequent analysis on at least a part of an image captured by image capture unit 206B when microlens array 204B was at the other position specified by controller 208B.

With reference again to FIG. 3B, method step 310B depicts constructing a composite image in response to the at least one region of the other image having a sharper focus relative to the focus of the at least one out-of-focus region of the primary image. In one implementation, the step of constructing a composite image in response to the at least one region of the other image having a sharper focus relative to the focus of the at least one out-of-focus region of the primary image includes the sub-step of replacing at least a part of the out-of-focus region of the primary image with at least a part of the at least one region of the other image. In yet another implementation, the step of constructing a composite image in response to the at least one region of the other image having a sharper focus relative to the focus of the at least one out-of-focus region of the primary image includes the sub-step of utilizing at least one of tiling image processing techniques, morphing image processing techniques, blending image processing techniques, and stitching image processing techniques.

In yet another implementation, the step of constructing a composite image in response to the at least one region of the other image having a sharper focus relative to the focus of the at least one out-of-focus region of the primary image includes the sub-steps of correlating a feature of the primary image with a feature of the other image; detecting at least one of size, color, and displacement distortion of at least one of the primary image and the other image; correcting the detected at least one of size, color, and displacement distortion of the at least one of the primary image and the other image; and assembling the composite image using the corrected distortion. In yet another implementation, the step of constructing a composite image in response to the at least one region of the other image having a sharper focus relative to the focus of the at least one out-of-focus region of the primary image includes the sub-step of correcting for motion between the primary and the other image.

Referring again to FIGS. 2B, 4B and/or 5B, one specific example of method step 310B (FIG. 3B) would be image construction unit 212B creating a composite image by replacing those portions of an image of person 202B captured at a primary position with more in-focus portions of an image of person 202B captured by image capture unit 206B when microlens array 204B was at the other position. In one implementation of the example, image construction unit 212B corrects for the motion between images using conventional techniques if such correction is desired. In another implementation of the example, motion correction is not used.

With reference again to FIG. 3B, method step 312B shows a determination of whether an aggregate change in position, relative to the primary position of method step 302B, has exceeded a maximum expected deviation of the microlens array. For example, even with a relatively poor quality microlens array, there will typically be an upper manufacturing limit beyond which microlens deviations are not expected to go (e.g., the microlens array has manufacturing criteria such that each microlens in the array provide a focal length of 5 mm+/−0.05 mm).

Referring again to FIGS. 2B, 4B and/or 5B, one specific example of method step 312B (FIG. 3B) would be controller 208B comparing an aggregate movement in a defined direction against a pre-stored upper limit deviation value. In an implementation of the example illustrated in FIG. 4B, if microlens array 204B has manufacturing criteria such as a focal length of 5 mm+/−0.05 mm, controller 208B will determine whether the total forward movement of the microlens array is greater than 0.05 mm relative to the primary position. In an implementation of the example illustrated in FIG. 5B, if microlens array 204B has manufacturing criteria such as a focal length of 5 mm+/−0.05 mm, controller 208B will determine whether the total rearward movement of microlens array 204B is greater than 0.05 mm relative to the primary position.

With reference again to FIG. 3B, if the inquiry of method step 312B yields a determination that the aggregate change in position has met or exceeded the maximum expected deviation of the microlens array, the process proceeds to method step 314B. Method step 314B illustrates that the current composite image (e.g., of method step 310B) is stored and/or displayed. One specific example of method step 314B would be image store/display unit 214B either storing or displaying the composite image.

Method step 316B shows the end of the process.

Returning to method step 312B, shown is that in the event that the upper limit on microlens array tolerance has not been met or exceeded, the process proceeds to method step 306B and continues as described herein.

Referring now to FIG. 4B, depicted is a side-plan view of the system of FIG. 2B wherein microlens array 204B has been moved in accordance with aspects of the process shown and described in relation to FIG. 3B. Microlens array 204B of lens system 200B is illustrated as having been moved to another position forward of the primary position which gave rise to the five different portions of image 100B shown and described in relation to FIGS. 1B and 2B. Specifically, microlens array 204B of lens system 200B is illustrated as repositioned such that fifth portion 108B of image 100B is right sized and focused on an imaging surface of photo-detector array 102B (e.g., as shown and described in relation to method step 306B). In one implementation, fifth portion 108B of image 100B can be combined with previously captured in focus and right sized portions 106B (e.g., FIGS. 1B and 2B) to create a composite image such that the defects associated with fifth portion 108 as shown and described in relation to FIGS. 1B and 2B are alleviated (e.g., as shown and described in relation to method step 310B). The remaining components and control aspects of the various parts of FIG. 4B function as described elsewhere herein.

With reference now to FIG. 5B, illustrated is another side-plan view of the system of FIG. 2B wherein microlens array 204B has been moved in accordance with aspects of the process shown and described in relation to FIG. 3B. Microlens array 204B of lens system 200 is illustrated as having been moved to another position rearward of the primary position which gave rise to the five different portions of image 100B shown and described in relation to FIG. 1B. Specifically, microlens array 204B of lens system 200B is illustrated as positioned such that first portion 104B of image 100B is right sized and focused on an imaging surface of photo-detector array 102B (e.g., as described in relation to method step 306B). In one implementation, first portion 104B of image 100B can be combined with previously captured in focus and right sized portions 106B, 108B (e.g., FIGS. 1B, 2B, and 4B) to create a composite image such that the defects associated with first portion 104B as shown and described in relation to FIGS. 1B and 2B are alleviated (e.g., as shown and described in relation to method step 310B). The remaining components and control aspects of the various parts of FIG. 5B function as described elsewhere herein.

What is claimed is:

1. A mobile device comprising:
   a communications unit;
   a microlens array;
   image capture circuitry; and
   a capture structure arranged to provide relative motion/focus between at least one microlens of the microlens array and said image capture circuitry, including at least:
      at least one microlens or at least one photo-detector of a photo-detector array operably coupled with an electronically-driven controller configured to provide a focus of at least a first part of a field of view substantially at an at least one photo-detector of the photo-detector array; and
      at least one microlens or at least one photo-detector of a photo-detector array operably coupled with the electronically-driven controller configured to provide a secondary focus substantially at an at least one photo-detector of the photo-detector array of at least a second part of the field of view, the at least the second part of the field of view having a primary focus different from the at least the first part of the field of view.

2. The mobile device of claim 1, wherein the mobile device comprises one or more of personal digital assistant (PDA), a personal entertainment device, a mobile phone, a laptop computer, a tablet personal computer, an iPhone, a smartphone, a digital still camera, or a digital video camera.

3. The mobile device of claim 1, wherein said a communications unit further comprises:
   a communications unit operably coupled with at least one digital communication link.

4. The mobile device of claim 1, wherein said a communications unit further comprises:
   a communications unit operably coupled with least one analog communication link.

5. The mobile device of claim 1, wherein said communications unit further comprises:
   at least one of a modem or a communications switch.

6. The mobile device of claim 1, wherein said communications unit further comprises:
at least optical-electrical equipment.

7. The mobile device of claim 1, wherein said microlens array further comprises:
at least two microlenses.

8. The mobile device of claim 7, wherein said at least two microlenses further comprise:
at least one microlens focusing at least a first part of a field of view; and
at least one microlens focusing at least a second part of the field of view, the at least the second part of the field of view different from the at least the first part of the field of view.

9. The mobile device of claim 8, further comprising:
at least one microlens focusing at least a third part of the field of view, the at least the third part of the field of view different from the at least the second part of the field of view and different from the at least the first part of the field of view.

10. The mobile device of claim 1, wherein said image capture circuitry further comprises:
at least one photo-detector array having at least one photo-detector.

11. The mobile device of claim 1, further comprising:
an image construction unit configured to combine at least a focused first part of the field of view with at least a focused second part of the field of view, the at least the focused second part of the field of view different from the at least the focused first part of the field of view.

12. The mobile device of claim 1, wherein said capture structure arranged to provide relative motion/focus between at least one microlens of the microlens array and said image capture circuitry further comprises:
at least one microlens or at least one photo-detector of a photo-detector array operably coupled with the electronically-driven controller configured to provide a secondary focus substantially at an at least one photo-detector of the photo-detector array of at least a third part of the field of view, the at least the third part of the field of view having a primary focus different from the at least the second part of the field of view and different from the at least the first part of the field of view.

13. The mobile device of claim 12, further comprising:
an image construction unit configured to combine at least a focused first part of the field of view with at least a focused second part of the field of view, the at least the focused second part of the field of view different from the at least the focused first part of the field of view, and with at least a focused third part of the field of view, the at least the focused third part of the field of view different from the at least the focused second part of the field of view and different from the at least the focused first part of the field of view.

14. A mobile device comprising:
a communications unit;
a microlens array;
image capture circuitry; and
a capture structure arranged to provide relative motion/focus between at least one microlens of the microlens array and said image capture circuitry, including at least:
an electronically-driven controller configured to provide a respective focus for at least two different parts of substantially the same field of view at least partially via at least one of an electrical field-actuated focusing apparatus, a magnetic field-actuated focusing apparatus, an optical-field focusing apparatus, a MEMS focusing apparatus, or an electro-mechanical focusing apparatus.

15. The mobile device of claim 14, wherein said microlens array further comprises:
a lens system.

16. The mobile device of claim 14, wherein said microlens array further comprises:
a lens system including at least one lens.

17. The mobile device of claim 14, wherein said microlens array further comprises:
at least one transforming optic.

18. The mobile device of claim 14, wherein said microlens array further comprises:
at least one of a Fourier lens or a Fresnel lens.

* * * * *